United States Patent
Amano et al.

(10) Patent No.: US 9,460,270 B2
(45) Date of Patent: Oct. 4, 2016

(54) GENERATING CHILD VIRTUAL MACHINE TO EXECUTE AUTHORIZED APPLICATION WITH REDUCED RISK OF MALWARE ATTACK

(75) Inventors: Katsushige Amano, Kyoto (JP); Masahiko Saito, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 480 days.

(21) Appl. No.: 13/807,202

(22) PCT Filed: Feb. 21, 2012

(86) PCT No.: PCT/JP2012/001130
§ 371 (c)(1),
(2), (4) Date: Dec. 27, 2012

(87) PCT Pub. No.: WO2012/147252
PCT Pub. Date: Nov. 1, 2012

(65) Prior Publication Data
US 2013/0097603 A1 Apr. 18, 2013

(30) Foreign Application Priority Data
Apr. 27, 2011 (JP) .................................. 2011-099701

(51) Int. Cl.
G06F 9/46 (2006.01)
G06F 9/455 (2006.01)
G06F 21/00 (2013.01)
G06F 9/48 (2006.01)
(Continued)

(52) U.S. Cl.
CPC .......... *G06F 21/00* (2013.01); *G06F 9/45533* (2013.01); *G06F 9/4843* (2013.01); *G06F 21/53* (2013.01); *G06F 21/566* (2013.01)

(58) Field of Classification Search
None
See application file for complete search history.

(56) References Cited

U.S. PATENT DOCUMENTS

| 2003/0037089 A1 | 2/2003 | Cota-Robles et al. |
| 2004/0010787 A1 | 1/2004 | Traut et al. |
| 2005/0149933 A1 | 7/2005 | Saito et al. |

(Continued)

FOREIGN PATENT DOCUMENTS

| CN | 101946252 A | 1/2011 |
| CN | 101951411 A | 1/2011 |

(Continued)

OTHER PUBLICATIONS

International Search Report issued Mar. 19, 2012 in International (PCT) Application No. PCT/JP2012/001130.

(Continued)

*Primary Examiner* — Meng An
*Assistant Examiner* — Bradley Teets
(74) *Attorney, Agent, or Firm* — Wenderoth, Lind & Ponack, L.L.P.

(57) ABSTRACT

When a predetermined application program becomes the target of execution on a virtual machine that is currently being executed, the virtual machine that is currently being executed is designated as a parent virtual machine, and a child virtual machine to execute the predetermined application program is generated by forking. The generated child virtual machine is configured not to execute any application program other than the predetermined application program. The parent virtual machine executes a dummy application program instead of the predetermined application program.

13 Claims, 15 Drawing Sheets

(51) Int. Cl.
*G06F 21/53* (2013.01)
*G06F 21/56* (2013.01)

(56) References Cited

U.S. PATENT DOCUMENTS

| | | | |
|---|---|---|---|
| 2006/0037003 A1* | 2/2006 | Long et al. | 717/127 |
| 2009/0138548 A1* | 5/2009 | Kumagai | H04L 67/02 |
| | | | 709/203 |
| 2009/0300599 A1* | 12/2009 | Piotrowski | 717/174 |
| 2010/0333100 A1 | 12/2010 | Miyazaki et al. | |
| 2011/0219374 A1* | 9/2011 | Mann | 718/1 |
| 2012/0144489 A1* | 6/2012 | Jarrett et al. | 726/24 |
| 2013/0055396 A1* | 2/2013 | Wang et al. | 726/24 |
| 2013/0212575 A1 | 8/2013 | Ito et al. | |
| 2013/0254369 A1* | 9/2013 | Rogel et al. | 709/223 |

FOREIGN PATENT DOCUMENTS

| | | |
|---|---|---|
| JP | 2000-242512 | 9/2000 |
| JP | 2009-238153 | 10/2009 |
| WO | 2009/133669 | 11/2009 |
| WO | 2010/032558 | 3/2010 |

OTHER PUBLICATIONS

Chinese Office Action issued Apr. 21, 2015, in Chinese Application No. 201280001814.6 (with partial English translation).

* cited by examiner

FIG. 4

Protected task correspondence table 400

| Application program ID | Protection target flag |
|---|---|
| 0001 | 0 |
| 0002 | 1 |
| 0003 | 0 |
| ... | ... |
| kkkk | 0 |

FIG. 11A

Dummy program 1113        First part 1121
```
for(;;) {
    Request to switch the virtual machine to the child virtual machine;
    Relinquish program time slice, request to switch to another task;
}
```
                                    Second part 1122

FIG. 11B

Scheduling program 1117        First part 1131
```
for(;;) {
    Relinquish program time slice, request to switch to another task;
    Request to switch the virtual machine to the parent virtual machine;
}
```
                                    Second part 1132

GENERATING CHILD VIRTUAL MACHINE TO EXECUTE AUTHORIZED APPLICATION WITH REDUCED RISK OF MALWARE ATTACK

TECHNICAL FIELD

The present invention relates to virtual machine systems, and in particular to technologies for protecting specific applications from attacks by malware.

BACKGROUND

Background Art

Conventionally, virtual machine systems are known that copy a parent virtual machine to generate a child virtual machine, and then dynamically control execution of the generated virtual machine.

For example, Patent Literature 1 recites a virtual machine system that switches the virtual machine that is being executed based on the importance of tasks running on each virtual machine. Another example is Patent Literature 2, which recites a virtual machine system that switches the virtual machine that is being executed so that the virtual machine with the highest priority task is the target of execution.

CITATION LIST

Patent Literature

[Patent Literature 1]
   Japanese Patent Application 2000-242512
[Patent Literature 2]
   WO 2009/133669

SUMMARY

However, there are cases when an application program that has been checked to ensure that no malware is present (hereafter, an authorized application program) as well as an application program that may contain malware (hereafter, an unauthorized application program) may be present within an application program group that is the target of execution.

In such a situation when malware is present in the unauthorized application program, the authorized application program may be attacked if the malware is executed.

The following is a possible example of what may happen when the authorized application program is attacked. The authorized application program may be executed with an unsuitable method, and information which should be concealed, such as paid content saved in the system, personal information, an encryption key, or the like, may be read.

In conventional virtual machine systems that dynamically generate virtual machines, when a new child virtual machine is generated to run a new authorized application program, this child virtual machine is a copy of the parent virtual machine, and therefore when the application program group being executed by the parent virtual machine contains an unauthorized application program, the application program group being executed by the child virtual machine will also contain the unauthorized application program.

Accordingly, in conventional virtual machine systems, when the unauthorized application program targeted for execution by the parent virtual machine contains malware, the authorized application program may be attacked by the malware on the child virtual machine which was generated to execute the authorized application program.

The present invention has been conceived in view of the above problem, and an aim thereof is to provide a virtual machine system that is able to lower, compared to conventional systems, the risk of attack on an authorized application program due to execution of malware included in an unauthorized application program in the case that an application program group that is targeted for execution by a virtual machine includes both an authorized application program and an unauthorized application program.

In order to solve the above problems, a virtual machine system according to the present invention comprises a processor; and a hypervisor, executed on the processor, configured to cause the processor to control execution of a plurality of virtual machines, wherein the hypervisor includes: an execution detection unit configured to detect when a predetermined application program is scheduled to be newly executed on a virtual machine; and a virtual machine generation unit configured to generate, when the execution detection unit detects that the predetermined application program is scheduled to be newly executed on a first virtual machine, a new second virtual machine for executing the predetermined application program, the second virtual machine being based on the first virtual machine, and each of the plurality of virtual machines whose execution is controlled by the processor includes an execution control unit configured to cause, in the second virtual machine, the processor to execute only a specific group of programs that includes the predetermined application program, and to cause, in the first virtual machine, the processor to execute a predetermined dummy program instead of the predetermined application program.

In the virtual machine system of the present invention with the above structure, when an authorized application program is the predetermined application program, and an unauthorized application program is not included in the specific group of programs, no unauthorized application program is executed on the child virtual machine on which the authorized application program is executed, and moreover, no authorized application program is run on the parent virtual machine which could be running an unauthorized application program.

Accordingly, it is possible to lower, compared to conventional systems, the risk of attack on an authorized application program due to execution of malware included in an unauthorized application program in the case that an application program group that is targeted for execution by a virtual machine includes both an authorized application program and an unauthorized application program.

BRIEF DESCRIPTION OF DRAWINGS

FIG. 4 is a data structure diagram of a protected task correspondence table 400.

FIG. 11A is a program structure diagram for a dummy program 1113, and FIG. 11B is a program structure diagram for a scheduling program 1117.

DETAILED DESCRIPTION

Embodiment 1
Outline

The following will describe, as one embodiment of the virtual machine system of the present invention, a virtual machine system that includes a processor which has two program execution modes: a user mode in which application programs are executed, and a supervisor mode that is higher than the user mode. A hypervisor, running in the processor's supervisor mode, uses time-sharing to control the execution of a plurality of operating systems running in the processor's supervisor mode.

When a predetermined specific application program to be protected against attacks by malware is executed on a virtual machine that is currently being executed, this virtual machine system designates the virtual machine currently being executed as a parent virtual machine, and generates, by forking (described below), a child virtual machine to execute the specific application program. Then, the generated child virtual machine is configured not to execute any application programs except the specific application program. The parent virtual machine executes a dummy application program instead of the specific application program. As a result, even when malware that can attack the above specific application program is included among the application programs targeted for execution on the virtual machine system, the specific application program cannot be attacked by the malware.

The following describes, with reference to the drawings, the structure of the virtual machine system according to Embodiment 1 of the present invention.
Hardware Structure FIG. 1 is a block diagram showing the main hardware structure of a virtual machine system 100.

Figure 1:
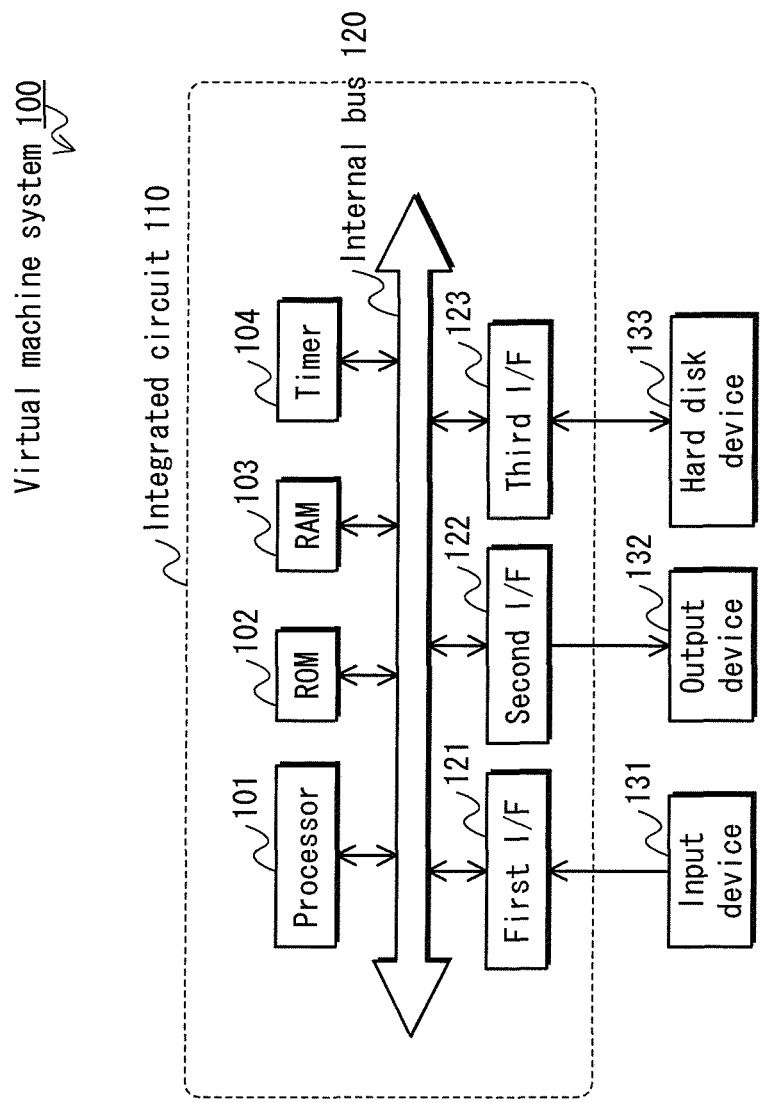
FIG. 1 is a block diagram showing the main hardware structure of a virtual machine system 100.

As shown in FIG. 1, the virtual machine system 100, as hardware, is a computer device made up of an integrated circuit 110, an input device 131, an output device 132 and a hard disk device 133.

The integrated circuit 110 is a semiconductor integrated circuit, with a processor 101, a ROM (Read Only Memory) 102, a RAM (Random Access Memory) 103, a timer 104, an internal bus 120, a first interface 121, a second interface 122, and a third interface 123 integrated into the circuit. The integrated circuit 110 is connected to the input device 131, the output device 132, and the hard disk device 133.

The processor 101 is connected to the internal bus 120, and has a function to control the ROM 102, the RAM 103, the timer 104, the input device 131, the output device 132, and the hard disk device 133 by running programs stored in the ROM 102 and RAM 103.

Figure 2:
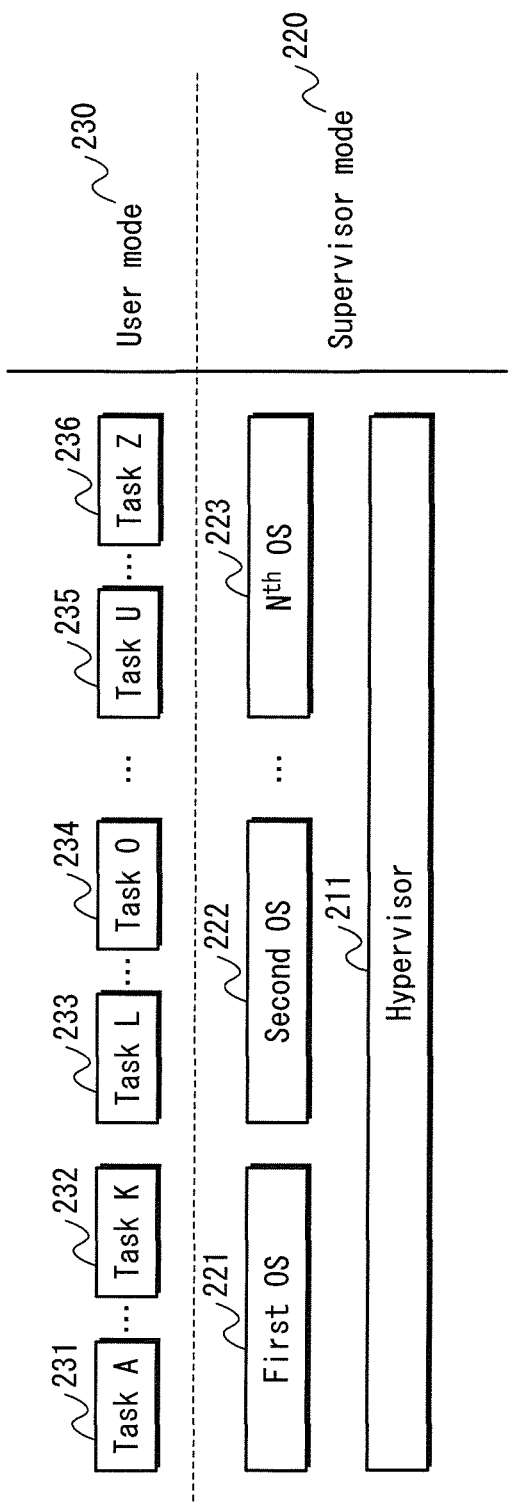
FIG. 2 is an operation mode diagram illustrating operation modes of a processor 101.

FIG. 2 is an operation mode diagram illustrating operation modes of the processor 101.

As shown in FIG. 2, the processor 101 has a user mode 230 for executing application programs (task A231, task K232, task L233, and the like in the figure), and a supervisor mode 220 that is a privileged mode for executing operating systems (first OS (Operating System) 221, second OS 222, $N^{th}$ OS 223, and the like in the figure), and a hypervisor (hypervisor 211 in the figure).

Execution of the application programs executed in the user mode 230 is controlled by time-sharing by the operating system executed in the supervisor mode 220. Execution of the operating systems executed in the supervisor mode 220 is controlled by time-sharing by the hypervisor also being executed in the supervisor mode 220.

Returning to FIG. 1, the explanation of the structure of the virtual machine system 100 will now continue.

The ROM 102 and the RAM 103 are both connected to the internal bus 120. The ROM 102 and the RAM 103 store data used by the processor 101 and programs that regulate the operations of the processor 101.

The timer 104 is connected to the internal bus 120 and controlled by the processor 101.

The internal bus 120 is connected to the processor 101, the ROM 102, the RAM 103, the timer 104, the first interface 121, the second interface 122, and the third interface 123, and has a function to transmit signals between the circuits connected thereto.

The first interface 121, the second interface 122, and the third interface 123 are all connected to the internal bus 120 and respectively have a function to mediate the exchange of signals between the internal bus 120 and the input device 131, a function to mediate the exchange of signals between the internal bus 120 and the output device 132, and the function to mediate the exchange of signals between the internal bus 120 and the hard disk device 133.

The input device 131 includes a keyboard, a mouse, a camera, a sensor, and the like, is connected to the first interface 121, and is controlled by the processor 101. The input device 131 has a function to generate data as a result of user operation or the like via the keyboard, the mouse, the camera, the sensor, or the like, and to transmit, to the processor 101, notification of the occurrence of a user operation and the generated data.

The output device 132 includes a display, a speaker, and the like, is connected to the second interface 122, and is controlled by the processor 101. The output device 132 has a function to display and output subtitles, images and audio, and the like using the display, the speakers, and the like.

The hard disk device 133 has an internal hard disk to store data used by the processor 101, is connected to the third interface 123, and is controlled by the processor 101. The hard disk device 133 has a function to write data to the internal hard disk, and a function to read data from the internal hard disk.
Program Module Structure FIG. 3 is a block diagram showing program modules (hereafter, simply "modules") targeted for execution by the processor 101 at a certain point in time t0.

Figure 3:
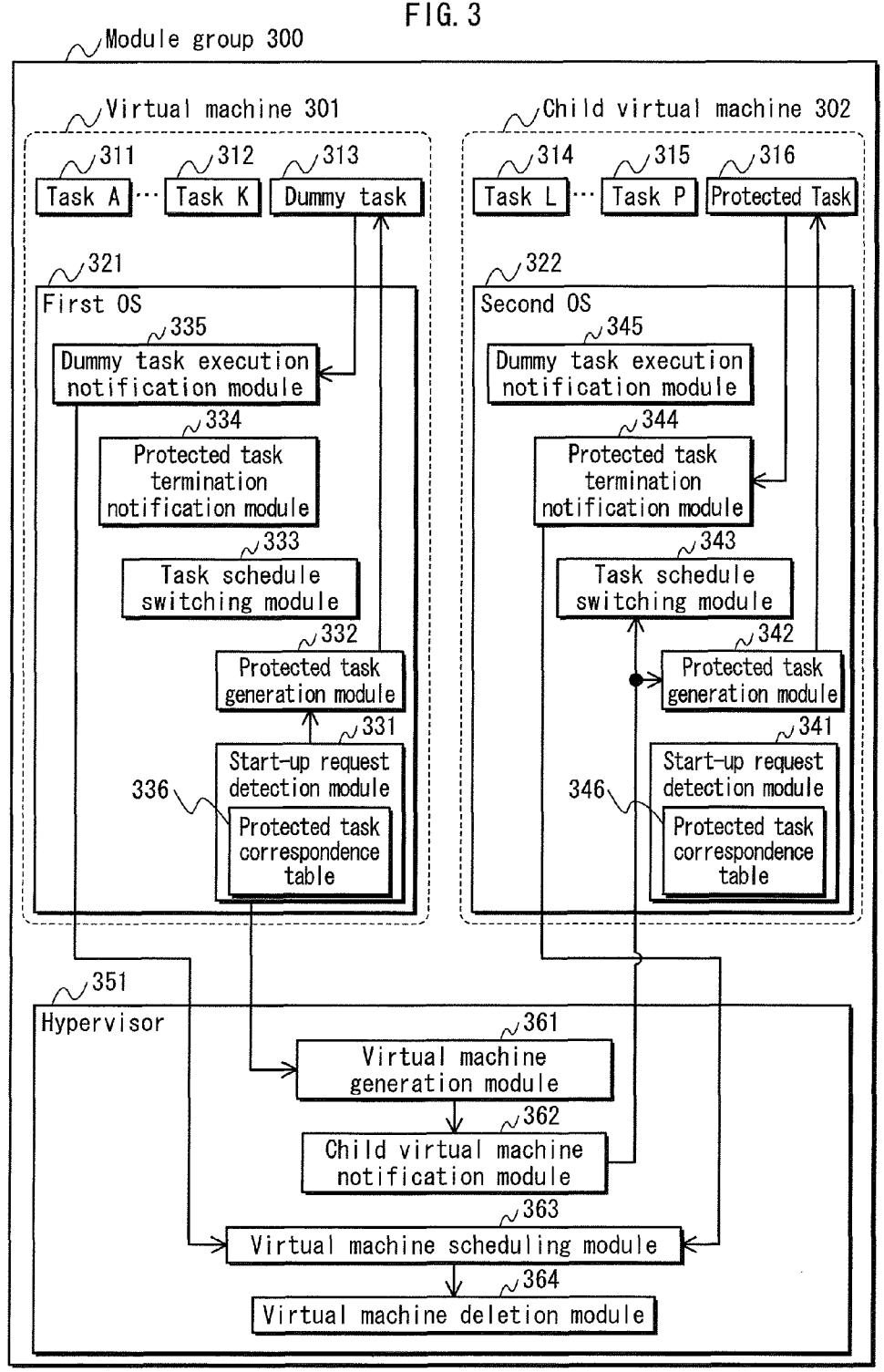
FIG. 3 is a block diagram showing program modules to be executed on the processor 101.

In FIG. 3, the module group 300 is an assembly of modules that are targeted for execution by the processor 101. The modules included in the module group 300 are stored in the memory areas of the ROM 102 and RAM 103.

Task A311 to task K312, dummy task 313, task L314 to task P315, protected task 316, and the like are tasks executed in the user mode of the processor 101.

The first OS 321 and second OS 322 are both operating systems with multitask capability and are executed in the supervisor mode of the processor 101.

The hypervisor 351 is a hypervisor executed in the supervisor mode of the processor 101.

A task can request a predetermined process of the operating system, by calling a pre-prepared operating system call routine. Also, the operating system can request a predetermined process of the hypervisor, by calling a pre-prepared hypervisor call routine.

Also, exceptions that are thrown during execution of the virtual machine system, as well as interruptions from the input device or the like, are processed by the hypervisor, and the operating system on the virtual machine is notified as necessary.

The protected task 316 is a task generated by the operating system (here, the second OS 322) starting up the predetermined application program targeted for protection. This application program targeted for protection is an application program to be protected against attacks by malware and is configured in advance to be protected by a protected task table 346, described below.

Examples of application programs to be protected include an application program handling personal information, an application program handling financial information, or an application program handling copyright protected video data.

The dummy task 313 is a task generated by the operating system (here, the first OS 321) starting up the predetermined dummy program. This dummy program is, for example, a program composed of an endless loop that repeats a NOP (No OPeration). The dummy program generates no new tasks.

The first OS 321 controls a plurality of tasks (here, task A311 to task K312 and the dummy task 313) by time-sharing, using time slices. The hypervisor 351 controls, as a virtual machine 301, a system made up of the first OS 321, task A311 to task K312, and the dummy task 313.

The second OS 322 controls a plurality of tasks (here, task L314 to task P315 and the protected task 316) by time-sharing, using time slices. The hypervisor 351 controls, as a virtual machine 302, a system made up of the second OS 322, task L314 to task P315, and the protected task 316.

Here, the child virtual machine 302 is a virtual machine generated by forking, with the virtual machine 301 as its parent virtual machine. The generation of the virtual machine by forking is described below.

In addition to a module group (not shown in the figures) that implements the functions of a general multitask operating system, the first OS 321 includes five internal modules: a start-up request detection module 331, a protected task generation module 332, a task schedule switching module 333, a protected task termination notification module 334, and a dummy task execution notification module 335. The start-up request detection module 331 internally stores a predetermined protected task table 336.

FIG. 4 is a data structure diagram of the protected task table 400 (the protected task table 336 and the protected task table 346, in FIG. 3) stored within the start-up request detection module 331 and the start-up request detection module 341.

As shown in FIG. 4, the protected task table 400 has a structure equipped with an application program ID 410 and a protection target flag 420. The protected task table 400 is predetermined at the time of system design.

The application program ID is an ID for identifying an application program.

The protection target flag 420 is a one-bit flag for showing whether or not the application program identified by the corresponding application program ID is an application program targeted for protection against attacks by malware.

Here, a logical value of "1" for the protection target flag 420 indicates that the application program identified with the corresponding application program ID is an application program targeted for protection against attacks by malware. A logical value of "0" for the protection target flag 420 indicates that the application program identified with the corresponding application program ID is not an application program targeted for protection against attacks by malware.

The protection target flag 420 indicates that the application program "0002", for example, identified by the application program ID 410, is an application program targeted for protection.

Returning to FIG. 3, the explanation of the module group targeted for execution on the processor 101 will now continue.

The start-up request detection module 331 internally stores the predetermined protected task table 336 and has the following two functions.

Function 1: When the start-up of a new application program is requested by a task whose execution is controlled by the operating system on which the start-up request detection module 331 is running (here, the first OS 321), the start-up request detection module 331 refers to the stored protected task table 336 to determine whether or not the application program whose start-up is requested is an application program targeted for protection.

Function 2: When the application program start-up is requested is an application program targeted for protection, the start-up request text module 331 notifies the protected task generation module included in the operating system on which the start-up requested text module 331 is running (here, the protected task module 332) and the virtual machine generation module 361 (described below) included in the hypervisor 351, that start-up of the application program targeted for protection has been requested.

The protected task generation module 332 has the following three functions.

Function 1: upon receiving notification from the child virtual machine notification module 362 (described below) included in the hypervisor 351 that the virtual machine to which belongs the operating system under which the protected task generation module 332 is running (here, the virtual machine 301) is a child virtual machine, the protected task generation module 332 starts up the application program targeted for protection and generates a protected task within the same virtual machine (here, the virtual machine 301).

Function 2: When not receiving notification, from the child virtual machine notification module 362 (described below) included in the hypervisor 351, that the virtual machine to which belongs the operating system under which the protected task generation module 332 is running (here, the virtual machine 301) is a child virtual machine, then when receiving notification, from the start-up request detection module (here, the start-up request detection module 331) included in the operating system on which the protected task generation module 332 is running, that start-up of the application program targeted for protection has been requested, the protected task generation module 332 starts up a dummy program instead of the application program targeted for protection and generates a dummy task within the virtual machine to which belongs the operating system under which the protected task generation module 332 is running (here, the virtual machine 301).

Function 3: When generating the dummy task, the protected task generation module 332 allocates, as the time slice used by the operating system for task switching, a time slice to the dummy task by allocating the same time slice as allocated to the corresponding protected task.

When the task schedule switching module 333 receives notification from the child virtual machine notification module 362 (described below) included in the hypervisor 351 that the virtual machine to which belongs the operating system under which the task schedule switching module 333 is running (here, the virtual machine 301) is a child virtual machine, then when a protected task is generated by the protected task generation module (here, the protected task generation module 332) included in the same operating system, the task schedule switching module 333 has a function to limit the tasks executed by the same operating system (here, the first OS 321) to the protected task.

The limiting of the task executed on the same operating system to the protected task may be accomplished by, for example, raising the priority of the protected task over other tasks, lowering the priority of other tasks below the protected task, or when the same operating system has a function to limit the executed tasks to a predetermined task, setting the protected task to be the predetermined task.

The protected task termination notification module 334 has a function to detect the termination of execution of a protected task whose execution is controlled by the operating system under which the protected task termination notification module 334 is running (here, the first OS 321) and to notify the virtual machine schedule module 363 (described below), included in the hypervisor 351, that the protected task has finished executing.

The dummy task execution notification module 335 has the following two functions.

Function 1: the dummy task execution notification module 335 detects the initiation of execution of a dummy task on the virtual machine belonging to the operating system under which the dummy task execution notification module 335 is running (here, the virtual machine 301), and notifies the virtual machine scheduling module 363 (described below), included in the hypervisor 351, that the dummy task has started executing.

Function 2: the dummy task execution notification module 335 detects the suspension of execution of a dummy task on the virtual machine belonging to the operating system under which the dummy task execution notification module 335 is running (here, the virtual machine 301) and notifies the virtual machine scheduling module 363 (described below), included in the hypervisor 351, that the execution of the dummy task has been suspended.

In addition to a module group (not shown in the diagrams) that implements the functions of a general multitask operating system, the second OS 322 includes five internal modules: a start-up request detection module 341, a protected task generation module 342, a task schedule switching module 343, a protected task termination notification module 344, and a dummy task execution notification module 345. The start-up request detection module 331 internally stores a predetermined protected task table 346.

The start-up request detection module 341, the protected task generation module 342, the task schedule switching module 343, the protected task termination notification module 344, the dummy task execution notification module 345, and the protected task table 346 all have the same functions as the start-up request detection module 331, the protected task generation module 332, the task schedule switching module 333, the protected task termination notification module 334, the dummy task execution notification module 335, and the protected task table 336 included in the first OS 321, and thus a description thereof is omitted.

However, among these components, the protected task generation module 342 and the task schedule switching module 343 operate differently from the protected task generation module 332 and the task schedule switching module 333 in accordance with whether notification has been received from the child virtual machine notification module 362 that the virtual machine to which belongs the operating system under which the protected task generation module 342 and task schedule switching module 343 are running is a child virtual machine.

The hypervisor 351 internally includes a virtual machine generation module 361, a child virtual machine notification module 362, a virtual machine scheduling module 363, and a virtual machine deletion module 364.

When receiving, from the start-up request detection module 331 of the virtual machine (here, the virtual machine 301), notification of a request for start-up of an application program targeted for protection, the virtual machine generation module 361 has a function to generate a new child virtual machine by forking (here, the virtual machine 302).

Here, the generation of a virtual machine by forking refers to generating a new virtual machine by mapping the memory areas allocated to a parent virtual machine onto the memory areas of a newly generated virtual machine so that the memory areas allocated to the parent virtual machine correspond one by one to the memory areas allocated to the newly generated virtual machine. Note that after generating the new virtual machine, the memory areas of the parent virtual machine and the memory areas of the new virtual machine will be managed by the copy-on-write method.

When the virtual machine generation module 361 generates a new child virtual machine (here, the child virtual machine 302), the child virtual machine notification module 362 has a function to notify the protected task generation module 342 and the task schedule switching module 343 running on the child virtual machine 302 that the virtual machine is a child virtual machine.

Examples of methods for notifying each module that the virtual machine is a child virtual machine include a method by which the child virtual machine notification module 362 records information that the virtual machine is a child virtual machine in a specific memory area, generates an interrupt for the virtual machine, and causes the modules to refer to the information recorded in the specific memory area, as well as a method by which these modules are notified that the virtual machine to which the modules belong is a child virtual machine as a result of calling a predetermined function when the modules are called.

The virtual machine scheduling module 363 has the following three functions.

Function 1: If the parent virtual machine (here, the virtual machine 301) is the virtual machine targeted for execution, then when notification is received from the dummy task execution notification module 335 that the dummy task 313 has started running, the virtual machine scheduling module 363 switches the virtual machine targeted for execution from the virtual machine 301 to its child virtual machine (here, the child virtual machine 302).

Function 2: If the child virtual machine (here, the child virtual machine 302) is the virtual machine targeted for execution, then when notification that execution of the dummy task 313 has been suspended is received from the dummy task execution notification module 335 of the parent virtual machine (here, the virtual machine 301), the virtual machine scheduling module 363 switches the virtual machine targeted for execution from the child virtual machine 302 to its parent virtual machine (here, the virtual machine 301).

Function 3: If the child virtual machine (here, the virtual machine 302) is the virtual machine targeted for execution, then when notification that the protected task 316 has finished executing is received from the protected task termination notification module 344 of the child virtual machine 302 currently being executed, the virtual machine scheduling module 363 switches the virtual machine to be executed from the child virtual machine 302 to its parent virtual machine (here, the virtual machine 301) and notifies the operating system on the virtual machine 301 (here, the first OS 321) that the protected task 316 has finished executing.

If the child virtual machine (here, the child virtual machine 302) is the virtual machine targeted for execution, then when the virtual machine scheduling module 363 is notified by the protected task termination notification module 344 that the protected task 316 has finished executing, and the virtual machine scheduling module 363 switches the virtual machine targeted for execution from the child virtual machine 302 to its parent virtual machine (here, the virtual machine 301), the virtual machine deletion module 364 has a function to delete the child virtual machine 302.

Here, the deletion of the virtual machine refers to excluding the virtual machine from the target of execution by time-sharing, and freeing the allocated memory areas of the virtual machine.

The operations of the virtual machine system 100 with the above structure are explained below with reference to the drawings.

Operations

Here, among operations of the virtual machine system 100, the following characteristic operations are described: child virtual machine generation, a child virtual machine deletion, and protected task execution.

The following explanation assumes that the virtual machine 301 has not received notification from the child virtual machine notification module 362 that the virtual machine 301 is a child virtual machine.

Child Virtual Machine Generation

Child virtual machine generation is a process whereby the virtual machine system 100 generates a new child virtual machine in order to execute a protected task.

Figure 5:
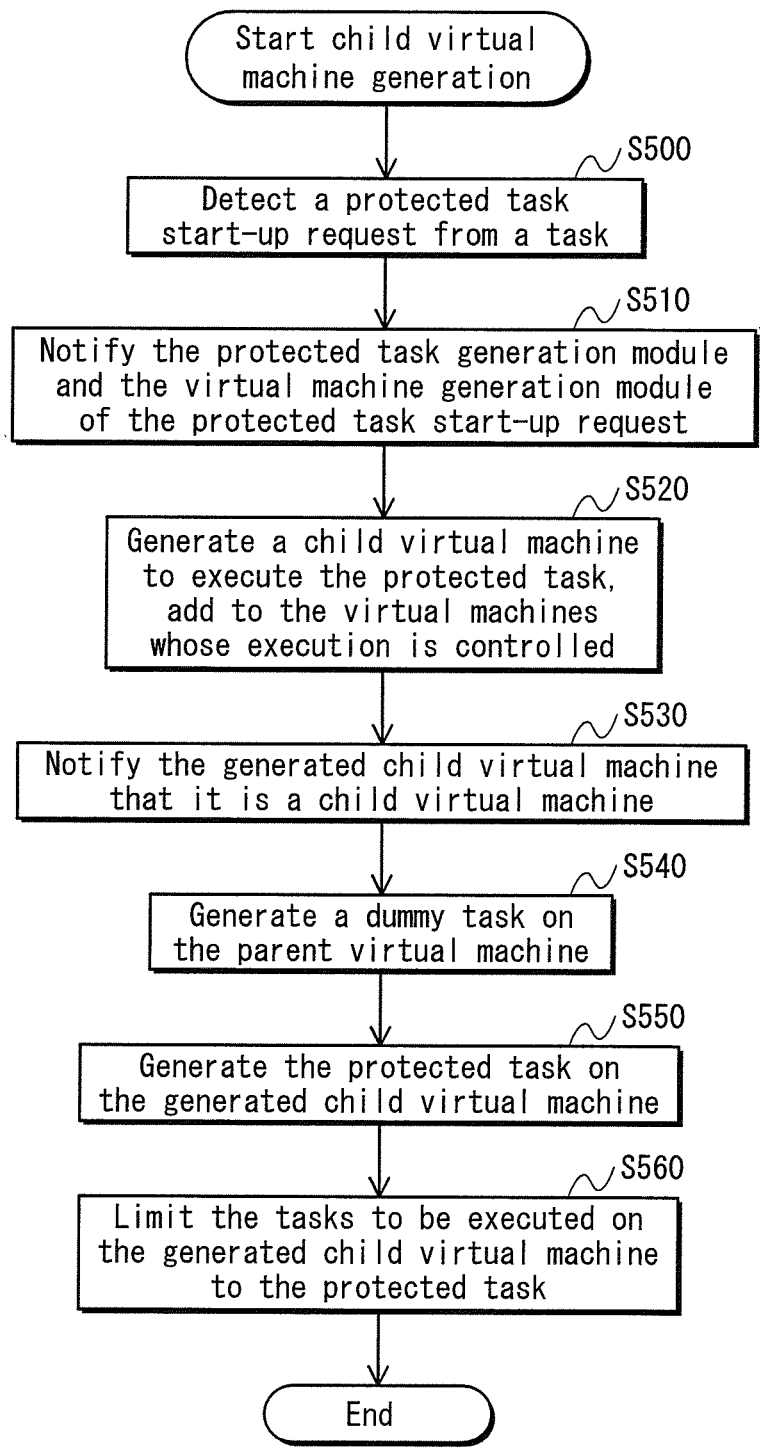
FIG. 5 is a flowchart of child virtual machine generation.

FIG. 5 is a flowchart illustrating child virtual machine generation.

Child virtual machine generation begins when a task whose execution is being controlled by a virtual machine (here, the virtual machine 301) issues a request to an operating system included in the virtual machine (here, the first OS 321) for start-up of an application program targeted for protection.

The start-up request for the application program targeted for protection from the task whose execution is being controlled occurs when, for example, the input device 131 (see FIG. 1) is operated by the user of the virtual machine system 100.

When child virtual machine generation begins, the start-up request detection module 331 (see FIG. 3) refers to the stored protected task table 336 and detects that the application program whose start-up has been requested is an application program targeted for protection (step S500).

Upon doing so, the start-up request detection module 331 notifies the protected task generation module 332 and the virtual machine generation module 361 that start-up has been requested for the application program targeted for protection (step S510).

When receiving notification from the startup notification detection module 331 that start-up has been requested for the application program targeted for protection, the virtual machine generation module 361 generates a new child virtual machine 302 by forking, based on the virtual machine 301. Then, the hypervisor 351 adds the generated child virtual machine 302 to the virtual machines whose execution is targeted for control (step S520).

Subsequently, the child virtual machine notification module 362 notifies the protected task generation module 342 and the task schedule switching module 343 of the child virtual machine 302 that the virtual machine to which belongs the operating system under which the protected task generation module 342 and task schedule switching module 343 are running is a child virtual machine is a child virtual machine (step S530).

Because the protected task generation module 332 of the virtual machine 301 does not receive notification from the child virtual machine notification module 362 that the virtual machine to which belongs the operating system under which the protected task generation module 332 is running is a child virtual machine, when receiving notification from the start-up request detection module 331 that a start-up request has been made for the application program targeted for protection, the protected task generation module 332 starts up a dummy program and generates a dummy task 313 on the virtual machine 301 (step S540).

When the protected task generation module 342 of the child virtual machine 302 receives notification from the child virtual machine notification module 362 that the virtual machine to which belongs the operating system under which the protected task generation module 342 is running is a child virtual machine, the protected task generation module 342 starts up the application module targeted for protection and generates a protected task 316 in the child virtual machine 302 (step S550). Then, once the protected task generation module 342 has generated the protected task 316, the task schedule switching module 343 limits the tasks to be executed on the second OS 322 to the protected task 316 (step S560).

When step S560 is complete, the virtual machine system 100 terminates child virtual machine generation.

Child Virtual Machine Deletion

Child virtual machine deletion is a process by which the virtual machine system 100 deletes the child virtual machine generated in order to execute a protected task.

Figure 6:
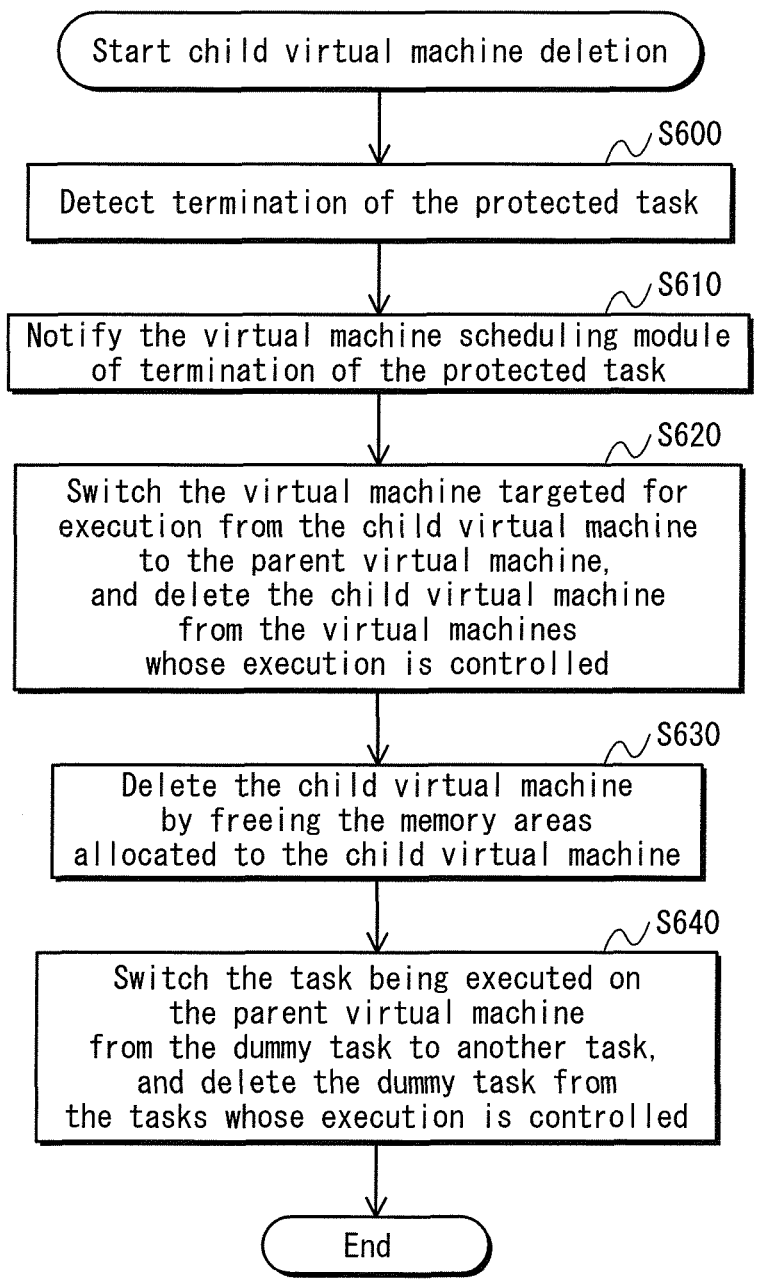
FIG. 6 is a flowchart of child virtual machine deletion.

FIG. 6 is a flowchart illustrating child virtual machine deletion.

Child virtual machine deletion begins when the protected task termination notification module 344 detects that a protected task (here, the protected task 316) being executed on a virtual machine (here, the child virtual machine 302) terminates upon completion of processing.

When child virtual machine deletion begins, the protected task termination notification module 344 detects that execution of the protected task 316 has terminated (step S600) and notifies the virtual machine scheduling module 363 that execution of the protected task has terminated (step S610).

When receiving notification from the protected task termination notification module 344 that execution of the protected task has terminated, the virtual machine scheduling module 363 switches the virtual machine targeted for execution from the child virtual machine 302 to the virtual machine 301 and notifies the first OS 321 that execution of the protected task 316 has terminated. Then, the hypervisor 351 deletes the child virtual machine 302 from the virtual machine group being managed as virtual machines whose execution is targeted for control (step S620).

When the virtual machine scheduling module 363 switches the virtual machine targeted for execution from the child virtual machine 302 to the virtual machine 301, the virtual machine deletion module 364 deletes the child virtual machine 302 by freeing the memory areas allocated to the child virtual machine 302 (step S630).

When receiving notification from the virtual machine scheduling module 363 that execution of the protected task 316 has terminated, the first OS 321 switches the task being executed from the dummy task 313 to another task and deletes the dummy task 313 from the tasks whose execution is targeted for control (step S640).

When step S640 is complete, the virtual machine system 100 terminates processing for child virtual machine deletion.

Protected Task Execution

Protected task execution is a process whereby the virtual machine system 100 executes a protected task.

Figure 7:
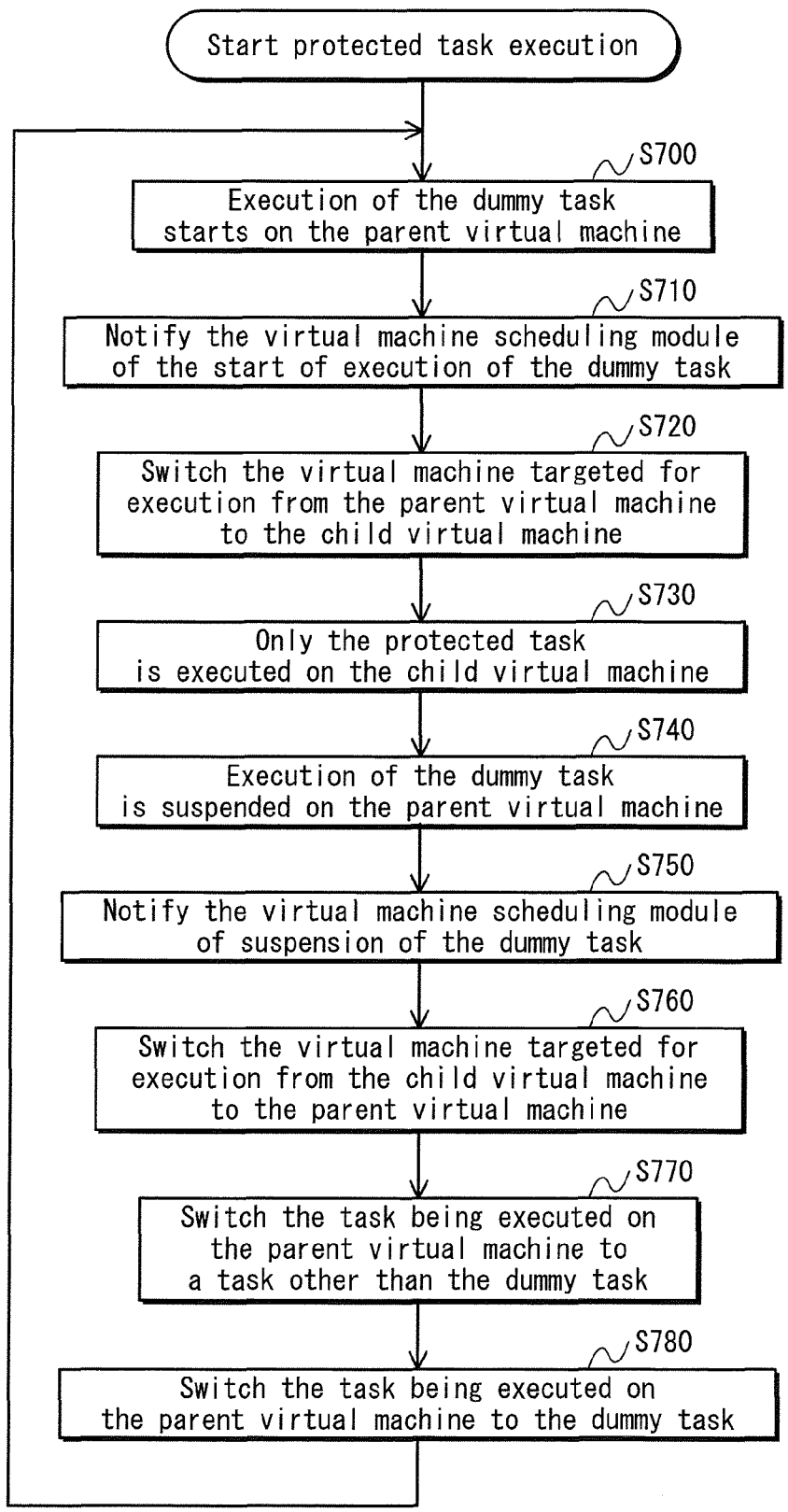
FIG. 7 is a flowchart of protected task execution.

FIG. 7 is a flowchart illustrating protected task execution.

Protected task execution begins upon the initiation of execution of the dummy task 313 on a parent virtual machine (here, the virtual machine 301).

When execution of the dummy task 313 targeted for control by time-sharing is initiated by the virtual machine 301 (step S700), the dummy task execution notification module 335 detects the initiation of execution of the dummy task and notifies the virtual machine scheduling module 363 that execution of the dummy task has been initiated (step S710).

When receiving notification from the dummy task execution notification module 335 that execution of the dummy task has been initiated, the virtual machine scheduling module 363 switches the virtual machine targeted for execution from the virtual machine 301 to the child virtual machine 302 (step S720).

When the virtual machine targeted for execution is switched to the child virtual machine 302, the child virtual machine 302 executes only the protected task 316 (step S730).

Subsequently, when execution of the dummy task 313 is suspended by the virtual machine 301 (step S740), the dummy task execution notification module 335 detects that execution of the dummy task has been suspended and notifies the virtual machine scheduling module 363 that execution of the dummy task has been suspended (step S750).

Here, examples of when execution of the dummy task 313 is suspended on the virtual machine 301 include when an interrupt for a task other than the dummy task 313 (here, task A311 to task K312) occurs in the virtual machine 301, or when the time slice for the dummy task 313 has expired in the virtual machine 301. Expiration of the time slice is, for example, detected by the timer 104 causing the processor 101 to generate an interrupt at the point when the time elapsed from the initiation of execution of the dummy task 313 exceeds the time slice.

When receiving notification from the dummy task execution notification module 335 that execution of the dummy task has been suspended, the virtual machine scheduling module 363 switches the virtual machine targeted for execution from the child virtual machine 302 to the virtual machine 301 (step S760).

On the virtual machine 301, the task being executed is switched from the dummy task 313 to a task other than the dummy task 313 (step S770).

Subsequently, when the task being executed on the virtual machine 301 once again switches from a task other than the dummy task 313 to the dummy task 313 (step S780), processing returns again to step S700, and processing from step S700 onwards is repeated.

Figure 8:
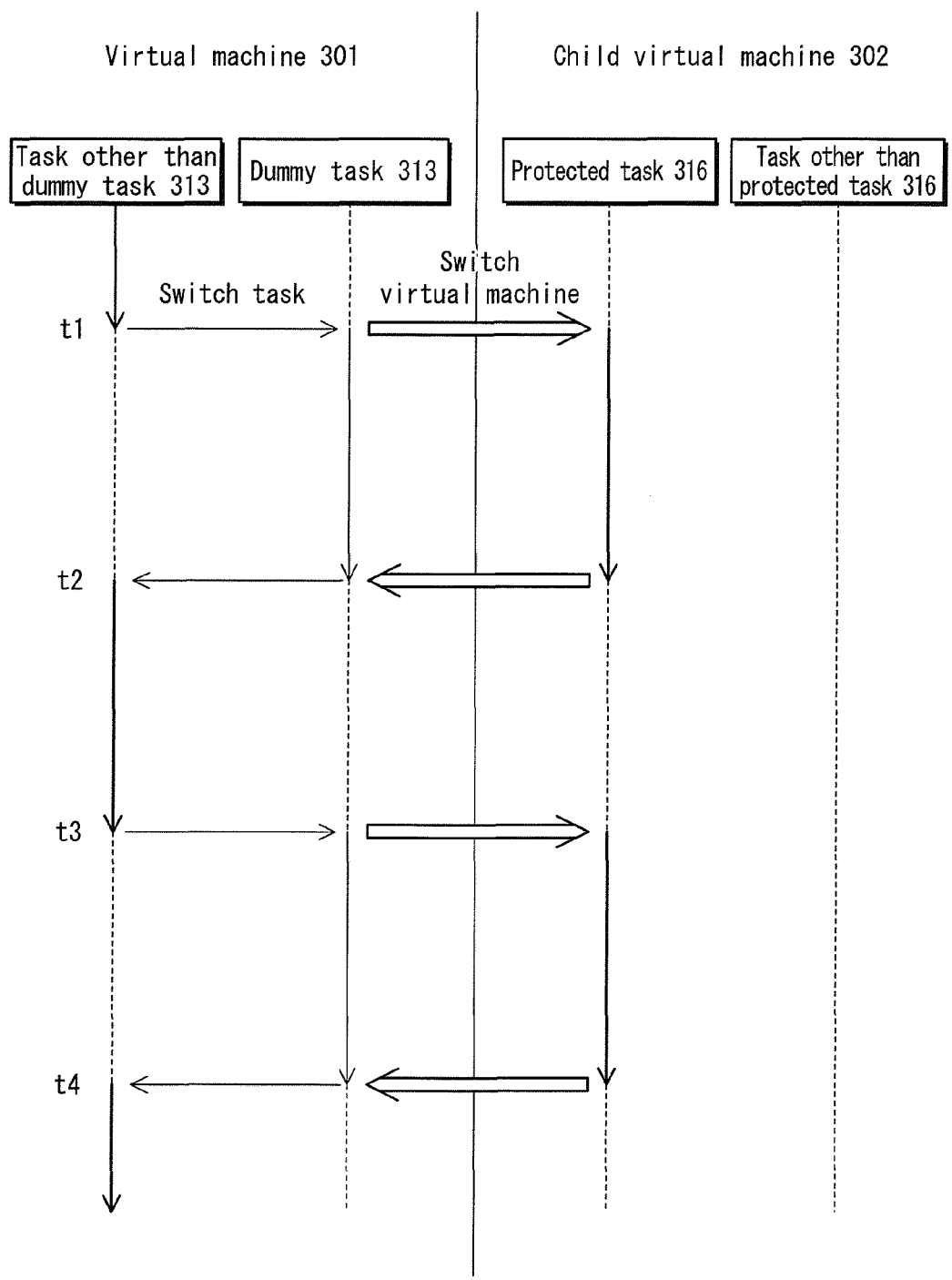
FIG. 8 is a schematic diagram showing tasks executed in the virtual machine system 100.

FIG. 8 is a schematic diagram illustrating tasks executed by the virtual machine system 100 during protected task execution.

On the virtual machine 301, at time t1, when the task being executed is switched from a task other than the dummy task 313 to the dummy task 313, and execution of the dummy task 313 is initiated (step S700), then the virtual machine scheduling module 363 is notified of the initiation of execution of the dummy task (step S710), the virtual machine being executed is switched from the virtual machine 301 to the child virtual machine 302 (step S720), and only the protected task 316 is executed on the child virtual machine 302 (step S730).

Subsequently, on the virtual machine 301, at time t2, when execution of the dummy task 313 is suspended (step S740), then the virtual machine scheduling module is notified of the suspension of execution of the dummy task (step S750), the virtual machine being executed is switched from the child virtual machine 302 to the virtual machine 301 (step S760), and on the virtual machine 301, the task being executed is switched from the dummy task 313 to a task other than the dummy task 313 (step S770).

When start-up is requested for a plurality of application programs targeted for protection.

The explanation thus far has focused on a start-up request for a single application program targeted for protection. However, when there is a plurality of application programs targeted for protection, start-up may be requested for a plurality of application programs targeted for protection. In such a case, for each of the application programs targeted for protection for which start-up is requested, a child virtual machine is generated to execute an application program targeted for protection.

Figure 9:
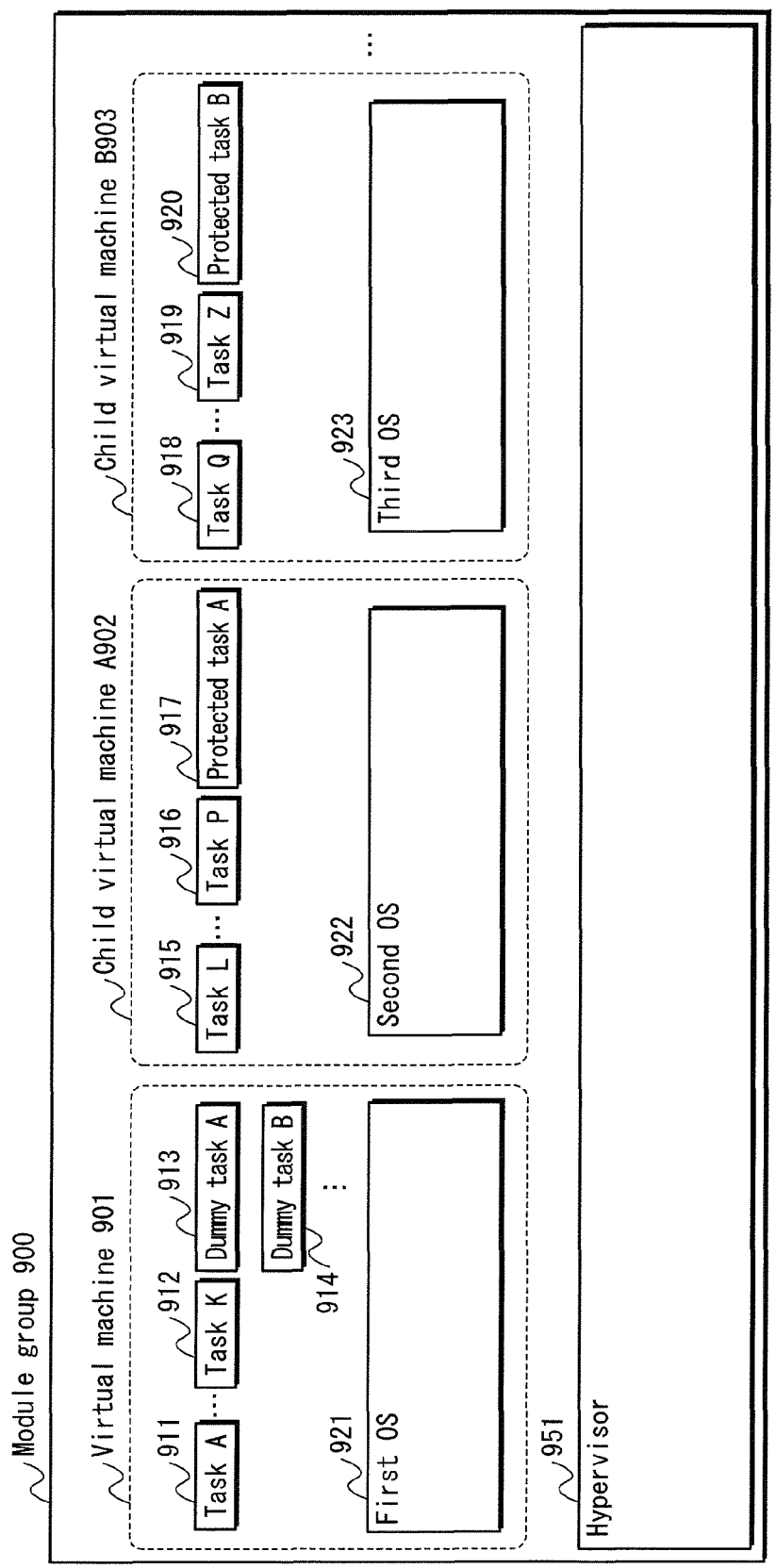
FIG. 9 is a block diagram showing the program module to be run on a processor 101.

FIG. 9 is a block diagram showing the module targeted for execution by a processor 101 at time t5 when start-up is requested for a plurality of different application programs to be protected at the same time.

FIG. 9 shows the generation of a plurality of child virtual machines (here, child machine A902, child machine B903, and the like) for executing an application program targeted for protection for each of a plurality of different application programs targeted for protection, whose start-up is requested on the virtual machine 901.

As shown in FIG. 9, protected tasks (here, protected task A917, protected task B920, and the like) for a plurality of application programs targeted for protection for which start-up has been requested on the virtual machine 901 are executed on independent child virtual machines (here, child virtual machine A902, child virtual machine B903, and the like).

Considerations

Using a detailed example, the operations of the virtual machine system 100 will be considered below.

As a concrete example, it is assumed that the application program corresponding to task A311 (see FIG. 3) and the application program corresponding to task L314 each include malware that attacks the application program targeted for protection corresponding to the protected task 316.

The task A311 could be executed on the virtual machine 301. In this case, if the task A311 currently being executed requests start-up of the application program targeted for protection, the protected task generation module 332 would start up a dummy program instead of the application program targeted for protection. As a result, the application program targeted for protection would not be started up.

Accordingly, on the virtual machine 301, the application program targeted for protection could not be attacked by the task A311.

Furthermore, the protected task 316 is generated on the child virtual machine 302 by the startup of the application program targeted for protection. Tasks other than the protected task 316, however, are not made the target of execution by the task schedule switching module 342. In other words, the task L314 is not executed on the child virtual machine 302.

Accordingly, on the child virtual machine 302, the application program targeted for protection is not attacked by the task L314.

In this way, with the virtual machine system 100 according to Embodiment 1 of the present invention, even if malware that will attack an application program targeted for protection is included in the application programs targeted for execution on a virtual machine, the risk of the application program targeted for protection being attacked by the malware is reduced as compared to conventional systems.

Also, with the virtual machine system 100 according to Embodiment 1 of the present invention, because tasks other than the protected task are executed on the parent virtual machine, and only the protected task is executed on the child virtual machine, there is no overlap between the tasks executed on the parent virtual machine and the task executed on the child virtual machine.

Embodiment 2

Outline

As an example of a virtual machine system according to the present invention, a modified virtual machine system that is a modification of a part of the virtual machine system 100 of Embodiment 1 is now described.

The modified virtual machine system according to Embodiment 2 has the same hardware structure as that of the virtual machine system 100 according to Embodiment 1. However, a portion of the software being run is modified from that of the virtual machine system 100 according to Embodiment 1.

In the virtual machine system 100 according to Embodiment 1, the dummy task execution notification module (for example the dummy task execution notification module 335) included in the operating system (for example the first OS 321) detects the initiation of execution of the dummy task and notifies the virtual machine scheduling module 363. In the virtual machine system according to Embodiment 2, however, the dummy task itself notifies the virtual machine scheduling module, via the operating system, that the dummy task has been initiated.

The modified virtual machine system of Embodiment 2 is now described with reference to the diagrams, with a focus on the differences between this system and the virtual machine system according to Embodiment 1.

Hardware Structure

The modified virtual machine system has the same hardware structure as that of the virtual machine system 100 according to Embodiment 1. Therefore, a description thereof is omitted.

The description of the constituent elements constituting the hardware of the modified virtual machine system adopts the same reference numbers as the constituent elements constituting the hardware of the virtual machine system 100 according to Embodiment 1.

Program Module Structure

Figure 10:
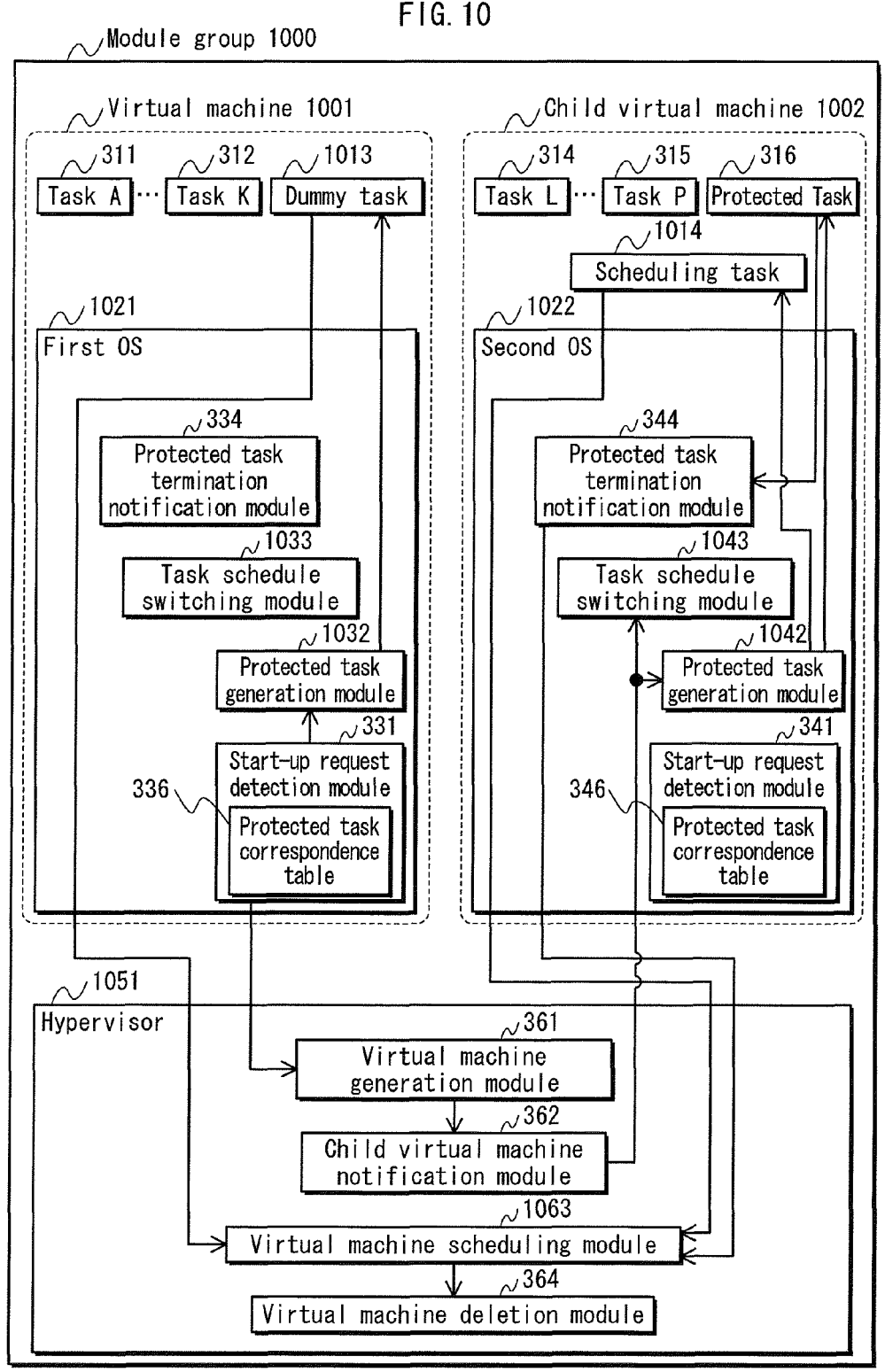
FIG. 10 is a block diagram showing the program module targeted for execution on the processor 101.

FIG. 10 is a block diagram showing the modules targeted for execution by the processor 101 at time t0.

In FIG. 10, a module group 1000 is a group of modules targeted for execution by the processor 101, with the modules included in the module group 1000 being stored in the memory areas of the ROM 102 or the RAM 103.

The module group 1000 differs from the module group 300 according to Embodiment 1 in the following ways: the dummy task 313 has been changed to a dummy task 1013, a scheduling task 1014 has been added, the dummy task execution notification module 335 and the dummy task execution notification module 345 have been removed, the task schedule switching module 333 has been changed to a task schedule switching module 1033, the task schedule switching module 343 has been changed to a task schedule switching module 1043, the protected task generation module 332 has been changed to a protected task generation module 1032, the protected task generation module 342 has been changed to a protected task generation module 1042, and the virtual machine scheduling module 363 has been changed to a virtual machine scheduling module 1063.

Also, the first OS 321 has been changed to a first OS 1021 in accordance with the changing of the task schedule switching module 333 to the task schedule switching module 1033 and the changing of the protected task generation module 332 to the protected task generation module 1032. The second OS 322 has also been changed to a first OS 1022 in accordance with the changing of the task schedule switching module 343 to the task schedule switching module 1043 and the changing of the protected task generation module 342 to the protected task generation module 1042.

Furthermore, the dummy task 313 has been changed to a dummy task 1013, and in accordance with the changing of the first OS 321 to the first OS 1021, the virtual machine 301 has been changed to a virtual machine 1001, and the scheduling task 1014 has been added. In accordance with the changing of the second OS 322 to the second OS 1022, the child virtual machine 302 has been changed to a child virtual machine 1002.

In accordance with the changing of the virtual machine scheduling module 363 to the virtual machine scheduling module 1063, the hypervisor 351 has been changed to a hypervisor 1051.

FIG. 11A is a program structure diagram showing the structure of the dummy program 1113 which corresponds to the dummy task 1013.

The dummy program corresponding to the dummy task 313 according to Embodiment 1 is a program that does not generate a new task, such as a program consisting of an endless loop that repeats a NOP. By contrast, the dummy program 1113 corresponding to the dummy task 1013 according to Embodiment 2 is composed of a first part 1121 and a second part 1122, as shown in FIG. 11A.

The first part 1121 is code for notifying the virtual machine scheduling module 1063 included in the hypervisor 1051 that the dummy task has been initiated, via the operating system (here, the first OS 1021) which controls execution of the dummy task (here, the dummy task 1013) corresponding to the dummy program that includes the first part 1121.

The second part 1122 is code for relinquishing the time slice allocated to the dummy task that includes the second part 1122 to the operating system controlling execution of the dummy task (here, the first OS 1021) and requesting that the operating system switch the task being executed from the dummy task to another task.

FIG. 11B shows the structure of a scheduling program 1117 which corresponds to the scheduling task 1014.

As shown in FIG. 11B, the scheduling program 1117 corresponding to the scheduling task 1014 is composed of a first part 1131 and a second part 1132.

The first part 1131 is code for relinquishing the time slice allocated to the scheduling task that includes the first part 1131 to the operating system controlling execution of the scheduling task (here, the second OS 1022) and requesting that the operating system switch the task being executed from the scheduling task to a different task.

The second part 1132 is code for issuing a request, via the operating system (here, the second OS 1022) controlling execution of the scheduling task corresponding to the scheduling program that includes the second part 1132 (here, the scheduling task 1014), to the virtual machine scheduling module 1063 included in the hypervisor 1051 to switch the virtual machine targeted for execution from the child virtual machine to which the scheduling task 1014 belongs (here, the child virtual machine 1002) to the parent virtual machine (here, the virtual machine 1001).

Returning to FIG. 10, the explanation of the module group targeted for execution by the processor 101 now continues.

The protected task generation module 1032 is a modification of the protected task generation module 332 according to Embodiment 1 yielded by modifying function 1 to modified function 1 below.

Modified function 1: upon receiving notification from the child virtual machine notification module 362 included in the hypervisor 1051 that the virtual machine to which belongs the operating system under which the protected task generation module 1032 is running (here, the virtual machine 1001) is a child virtual machine, the protected task generation module 1032 starts up the application program targeted for protection and the scheduling program and generates a protected task (here, the protected task 316) and a scheduling task (here, the scheduling task 1014) within the virtual machine to which the operating system belongs (here, the virtual machine 1001).

The task schedule switching module 1033 is a modification of the task schedule switching module 333 according to Embodiment 1 yielded by modifying the function thereof to the two modified functions below.

Modified function 1: when the task schedule switching module 1033 receives notification from the child virtual machine notification module 362 included in the hypervisor 1051 that the virtual machine to which belongs the operating system under which the task schedule switching module 1033 is running (here, the virtual machine 1001) is a child virtual machine, then when a protected task and a scheduling task are generated by the protected task generation module (here, the protected task generation module 1032) included in the same operating system, the task schedule switching module 1033 limits the tasks executed by the same operating system (here, the first OS 1021) to the protected task and the scheduling task.

Modified function 2: when execution of the protected task and the scheduling task is targeted for control, the task schedule switching module 1033 schedules the scheduling task to be executed first.

The virtual machine scheduling module 1063 is a modification of the virtual machine scheduling module 363 according to Embodiment 1 yielded by modifying function 2 to modified function 2 below.

Modified function 2: If the child virtual machine (here, the child virtual machine 1002) is the virtual machine targeted for execution, then upon receiving a request for switching the virtual machine targeted for execution from the child virtual machine 1002 to the parent virtual machine (here, the virtual machine 1001) from the scheduling task (here, the scheduling task 1014) via the operating system of the child virtual machine 1002 (here, the second OS 1022), the virtual machine scheduling module 1063 switches the virtual machine targeted for execution from the child virtual machine 1002 to the virtual machine 1001.

Operations

The modified virtual machine system with the above structure differs from the characteristic operations of the virtual machine system 100 according to Embodiment 1 in that the child virtual machine generation and protected task execution have been modified. With reference to the diagrams, the following description focuses on the differences between these operations and operations of the virtual machine system according to Embodiment 1.

Here, it is assumed that the virtual machine 1001 has not received notification that it is a child virtual machine from the child virtual machine notification module 362.

Modified Child Virtual Machine Generation

Modified child virtual machine generation is a process whereby the virtual machine system 1001 generates a new child virtual machine in order to execute a protected task. A portion of the child virtual machine generation according to Embodiment 1 has been modified.

Figure 12:
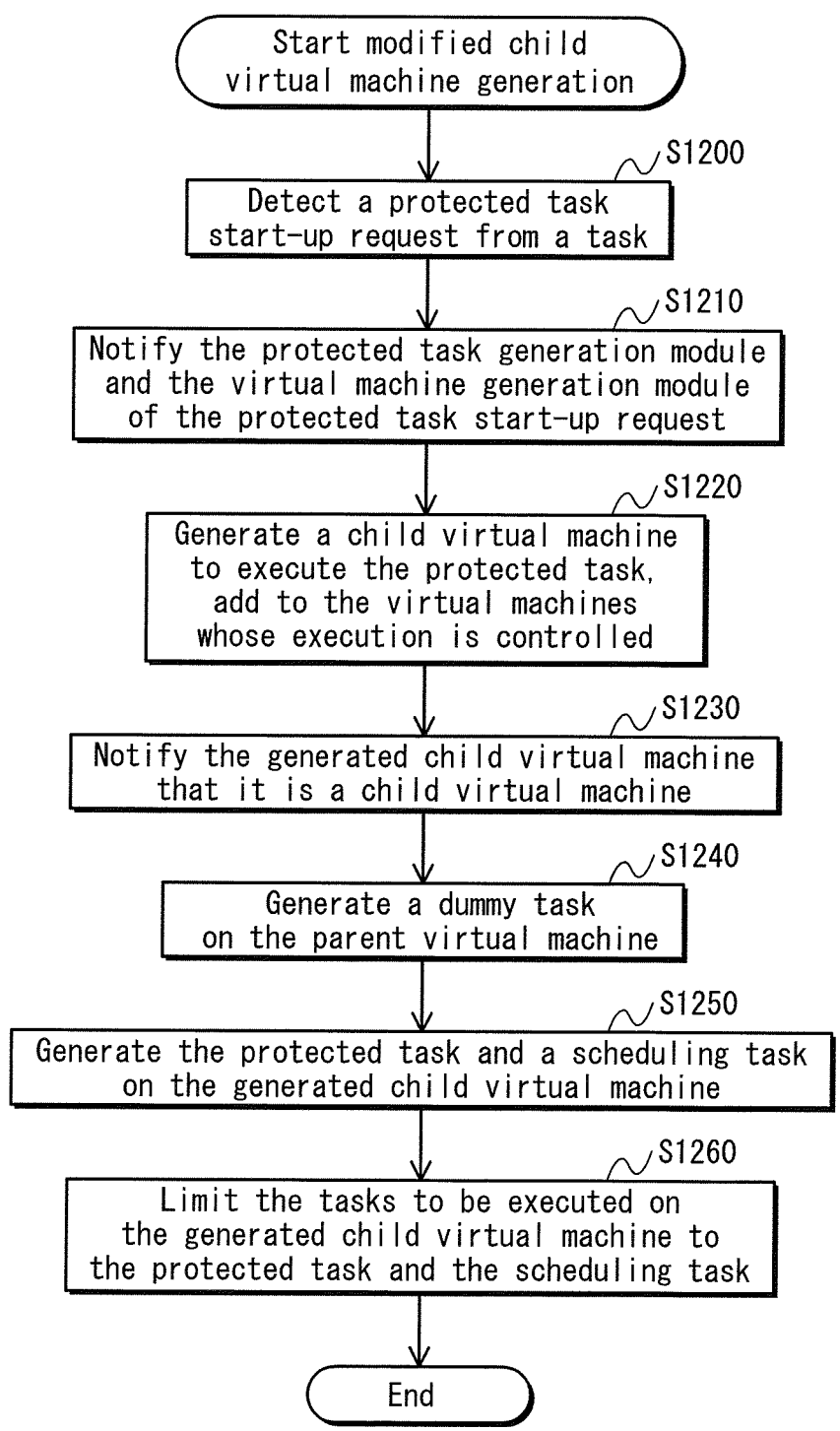
FIG. 12 is a flowchart of modified child virtual machine generation.

FIG. 12 is a flowchart illustrating modified child virtual machine generation.

Like child virtual machine generation according to Embodiment 1, modified child virtual machine generation begins when a task whose execution is being controlled by virtual machine (here, the virtual machine 1001) issues a request to an operating system included in the virtual machine (here, the first OS 1021) for start-up of an application program targeted for protection.

The processing in step S1200 through step S1240 is the same as in step S500 through step S540 of the child virtual machine generation according to Embodiment 1. Therefore, a description of these steps is omitted.

When the protected task generation module 342 of the virtual machine 1002 receives notification from the child virtual machine notification module 362 that the virtual machine to which belongs the operating system under which the protected task generation module 342 is running is a child virtual machine, the protected task generation module 342 starts up the application module targeted for protection and the scheduling program and generates a protected task 316 and a scheduling task 1014 in the child virtual machine 1002 (step S1250). Then, once the protected task generation module 342 has generated the protected task 316 and the scheduling task 1014, the task schedule switching module 343 limits the tasks to be executed on the second OS 1022 to the protected task 316 and the scheduling task 104 (step S1260).

When step S1260 is complete, the modified virtual machine system terminates modified child virtual machine generation.

Modified Protected Task Execution

Modified child virtual machine generation is a process whereby the modified virtual machine system generates a new child virtual machine in order to run a protected task. A portion of the child virtual machine generation according to Embodiment 1 has been modified.

Figure 13:
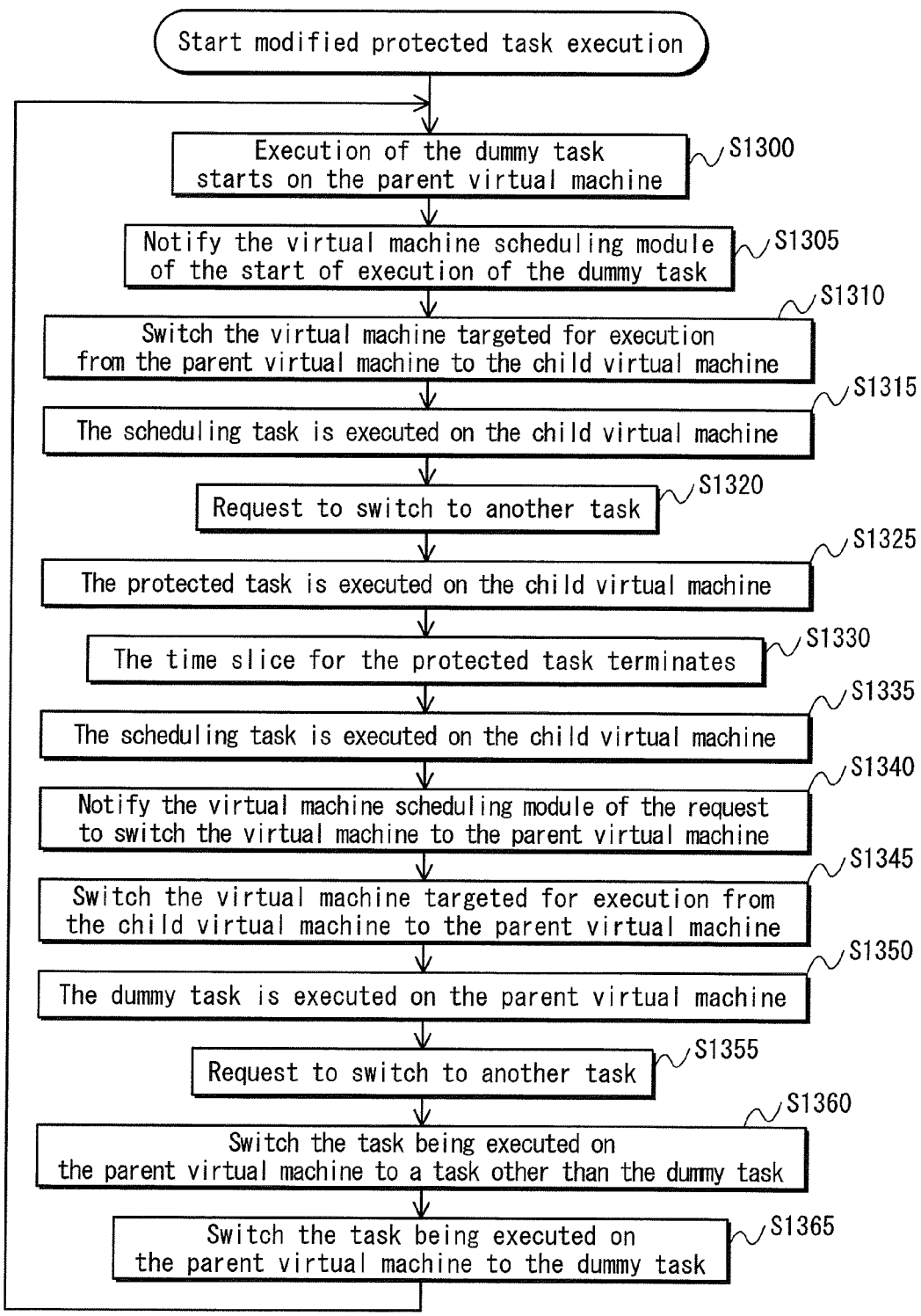
FIG. 13 is a flowchart of modified protected task execution.

FIG. 13 is a flowchart illustrating modified protected task execution.

Like protected task execution according to Embodiment 1, modified protected task execution begins upon the initiation of execution of the dummy task 1013 on a parent virtual machine (here, the virtual machine 1001).

When execution of the dummy task 1013 targeted for control by time-sharing is started up in the virtual machine 1001 (step S1300), the dummy task 1013 performs a process corresponding to the first part 1121 of the corresponding dummy program 1113. Then, via the first OS 1021, the dummy task 1013 notifies the virtual machine scheduling module 1063 included in the hypervisor 1051 that execution of the dummy task has been initiated (step S1305).

When receiving notification, via the first OS 1021, that execution of the dummy task has been initiated, the virtual machine scheduling module 1063 temporarily suspends execution of the virtual machine 1001 and switches the virtual machine targeted for execution from the virtual machine 1001 to the child virtual machine 1002 (step S1310).

When the virtual machine targeted for execution is switched to the child virtual machine 1002, the child virtual machine 1002 first initiates execution of the scheduling task 1014 (step S1315).

When execution of the scheduling task 1014 begins, the scheduling task 1014 performs a process corresponding to the first part 1131 of the corresponding scheduling program 1117, relinquishes the time slice allocated to the scheduling task 1014 to the second OS 1022, and requests that the second OS 1022 switch the task being executed from the scheduling task 1042 another task (in this case, the protected task 316) (step S1320).

When requested to switch the task being executed, the second OS 1022 temporarily interrupts execution of the scheduling task 1014 and switches the task being executed from the scheduling task 1014 to the protected task 316 (step S1325).

Subsequently, when the time corresponding to the time slice allocated to the scheduling task 1014 has elapsed (step S1330), the second OS 1022 switches the task being executed from the protected task 316 back to the scheduling task 1014, and initiates execution of the interrupted scheduling task 1014 (step S1335).

When the scheduling task 1014 is running again, the scheduling task 1014 performs a process corresponding to the second part 1132 of the corresponding scheduling program 1117 and, via the second OS 1022, requests that the virtual machine scheduling module 1063 included in the hypervisor 1051 switch the virtual machine targeted for execution from the child virtual machine 1002 to the virtual machine 1001 (step S1340).

When requested via the second OS 1022 to switch the virtual machine targeted for execution from the child virtual machine 1002 to the virtual machine 1001, the virtual machine scheduling module 1063 switches the virtual machine targeted for execution from the child virtual machine 1002 to the virtual machine 1001 (step S1345).

When the virtual machine targeted for execution is switched to the virtual machine 1001, the virtual machine 1001 initiates execution of the interrupted dummy task 1013 (step S1350).

When the dummy task 1013 is running again, the dummy task 1013 performs a process corresponding to the second part 1122 of the dummy program 1113 corresponding to the dummy task 1013, relinquishes the time slice allocated to the dummy task 1013 to the first OS 1021, and requests that the first OS 1021 switch the task being executed from the dummy task 1013 to another task (step S1355).

When receiving the request for the switching of the task being executed, the second OS 1022 switches the task being executed from the dummy task 1013 to a task other than the dummy task 1013 (step S1360).

Subsequently, when the task being executed on the virtual machine 1001 once again switches from a task other than the dummy task 1013 to the dummy task 1013 (step S1365), processing returns again to step S1300, and processing from step S1300 onwards is repeated.

Figure 14:
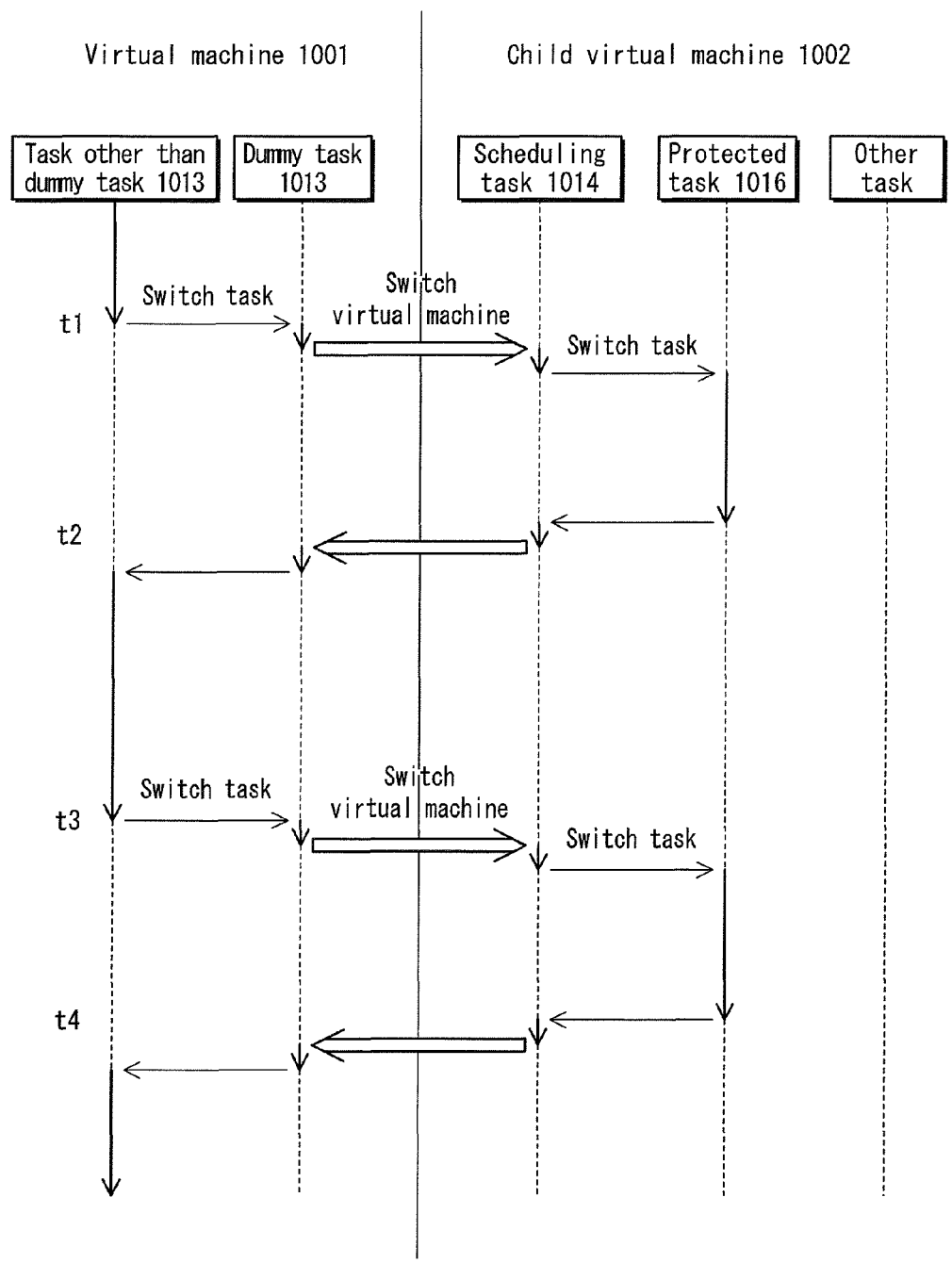
FIG. 14 is a schematic diagram showing tasks executed in the virtual machine system 100.

FIG. 14 is a schematic diagram illustrating tasks executed by the modified virtual machine system during modified protected task execution.

On the virtual machine 301, at time t1, when the task being executed is switched from a task other than the dummy task 1013 to the dummy task 1013, and execution of the dummy task 1013 is initiated (step S1300), the virtual machine scheduling module 1063 is notified of the initiation of execution of the dummy task (step S1305), the virtual machine being executed is switched from the virtual machine 1001 to the child virtual machine 1002 (step S1310), and the scheduling task 1014 is executed on the child virtual machine 1002 (step S1315).

When the scheduling task 1014 is executed, the second OS 1022 is requested to switch the task being executed to the protected task 316 (step S1320) and initiates execution of the protected task 316 (step S1325).

Subsequently, at time t2, when the time corresponding to the time slice allocated to the protected task has elapsed (step S1330), the second OS 1022 switches the task being executed to the scheduling task 1014 (step S1335). A request is made of the virtual machine scheduling module 1063 to switch the virtual machine targeted for execution to the virtual machine 1001 (step S1340), and the virtual machine targeted for execution is switched from the child virtual machine 1002 to the virtual machine 1001 (step S1345). Then, the dummy task 1013 is executed on the virtual machine 1001 (step S1350).

When the dummy task 1013 is executed, the first OS 1021 is requested to switch the task being executed to a different task (step S1355), and the first OS 1021 switches the task being executed to a different task (step S1360).

Summary

With the above modified virtual machine system according to Embodiment 2, in the same way as the virtual machine system 100 according to Embodiment 1, even if malware that will attack an application program targeted for protection is included in the application programs targeted for execution on a virtual machine, the risk of the application program targeted for protection being attacked by the malware is reduced as compared to conventional systems.

Also, the modified virtual machine system according to Embodiment 2, in the same way as the virtual machine system 100 according to Embodiment 1, prevents overlapping of the tasks executed on the parent virtual machine with the tasks executed on the child virtual machine.

Supplementary Explanation

As an embodiment of the virtual machine system of the present invention, two examples of virtual machine systems have been described in Embodiment 1 and Embodiment 2. However, the following modifications are also possible. The present invention is by no means limited to the virtual machine systems described exactly as in the above embodiments.

(1) In Embodiment 1, an example is described in which the virtual machine system 100 is provided with one processor. However, if the hypervisor can control execution of a plurality of virtual machines, then the number of processors is not limited to one. For example, a plurality of processors, such as two or three, may be provided. When a plurality of processors are provided, the hypervisor does not necessarily have to execute the virtual machines by time-sharing and may instead execute the virtual machines in parallel.

(2) In Embodiment 1, an example is described in which the processor 101, the ROM 102, the RAM 103, the timer 104, the internal bus 120, the first interface 121, the second interface 122, and the third interface 123 are integrated into one integrated circuit 110. However, these circuits do not necessarily need to be integrated into one integrated circuit. For example, the processor 101 could be integrated into a first integrated circuit, and the other circuits could be integrated into a second integrated circuit. As another example, each of the circuits could be integrated separately into a different integrated circuit.

Furthermore, the integrated circuit 110 may be implemented by a FPGA (Field Programmable Gate Array) whose functions can be programmed after manufacture, or by a reconfigurable processor whose functions can be reconfigured.

(3) In Embodiment 1, an example is described in which the processor 101 is provided with two operating modes. However, as long as the hypervisor can run in a privileged mode that is equal to or higher than the mode in which the operating system runs, then the number of operating modes need not be limited to two. For example, three or more operating modes may be provided. In such a case, the operating mode in which the hypervisor runs may be designated as a privileged mode that is higher than the mode in which the operating system runs.

(4) In Embodiment 1, and example is described in which virtual machines are generated by forking. This is because the memory areas of the RAM 103 can be efficiently utilized by generating virtual machines by forking.

However, if inefficiency can be tolerated in the usage efficiency of the memory areas of the RAM 103, then forking need not be used to generate a child virtual machine based on a parent virtual machine.

For example, a method is possible whereby a new virtual machine is generated by copying the memory areas allocated to a parent virtual machine into the memory areas of a newly generated virtual machine so that the memory areas allocated to the parent virtual machine correspond one to one to the memory areas allocated to the newly generated virtual machine.

Also, in this way, when the memory areas of the child virtual machine are copied from the memory areas of the parent virtual machine, it is not absolutely necessary for these memory areas to be managed by the copy-on-write method.

(5) In Embodiment 1, an example is described in which a start-up request detection module (for example, the start-up request detection module 331), a protected task generation module (for example, the protected task generation module 332), a task schedule switching module (for example, the task schedule switching module 333), a protected task termination notification module (for example, the protected task termination notification module 334), and a dummy task execution notification module (for example the dummy task execution notification module 335) are included in an operating system (for example, the first OS 321) within the virtual machine. However, if functions equivalent to the functions implemented by these modules are implemented by the virtual machine system 100, then these modules do not necessarily have to be included in an operating system within the virtual machine. For example, they may be included in the hypervisor 351.

For example, a function that is equivalent to the dummy task execution notification module 335 may be implemented by configuring the dummy task 313 to write into a predetermined, write-protected memory area upon being executed and providing the hypervisor 351 with a module to catch the exception thrown by the write violation upon writing into the predetermined memory area.

(6) The following describes the structure, modifications to, and effects of a virtual machine system as a further embodiment of the present invention.

(a) A virtual machine system according to an embodiment of the present invention comprises a processor; and a hypervisor, executed on the processor, configured to cause the processor to control execution of a plurality of virtual machines, wherein the hypervisor includes: an execution detection unit configured to detect when a predetermined application program is scheduled to be newly executed on a virtual machine; and a virtual machine generation unit configured to generate, when the execution detection unit detects that the predetermined application program is scheduled to be newly executed on a first virtual machine, a new second virtual machine for executing the predetermined application program, the second virtual machine being based on the first virtual machine, and each of the plurality of virtual machines whose execution is controlled by the processor includes an execution control unit configured to cause, in the second virtual machine, the processor to execute only a specific group of programs that includes the predetermined application program, and to cause, in the first virtual machine, the processor to execute a predetermined dummy program instead of the predetermined application program.

The virtual machine system according to the present embodiment with the above structure designates an authorized application program as the predetermined application program and does not include an unauthorized application program in the specific group of programs. Therefore, on the second virtual machine, on which the authorized application is executed, no unauthorized application program is executed. Furthermore, on the first virtual machine, on which the unauthorized application program might be executed, the authorized application program is not executed.

Accordingly, even when both an authorized application program and an unauthorized application program are included among application programs targeted for execution by a virtual machine, the risk of malware included in an unauthorized application program being executed and attacking the authorized program is lessened as compared to conventional systems.

Figure 15:
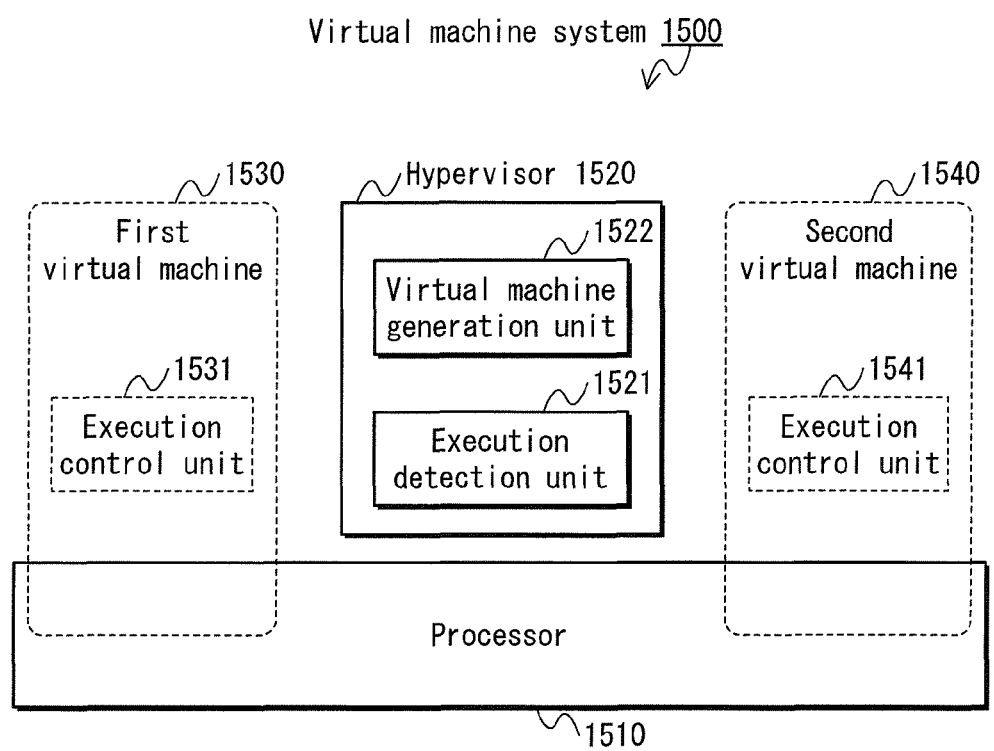
FIG. 15 is a schematic diagram of a virtual machine system 1500.

FIG. 15 is a structure diagram showing the structure of a virtual machine system 1500 according to the above modification.

As shown in FIG. 15, the virtual machine system 1500 includes a processor 1510 and a hypervisor 1520.

The processor 1510 includes a function to execute the hypervisor 1520. One example of the processor 1510 is the processor 101 of Embodiment 1.

The hypervisor 1520 has a function whereby, by being executed on the processor 1510, to cause the processor 1510 to control execution of a plurality of virtual machines (here, the first virtual machine 1530 and the second virtual machine 1540). One example of the hypervisor 1520 is the hypervisor 351 of Embodiment 1. Furthermore, the hypervisor 1520 has an execution detection unit 1521 and a virtual machine generation unit 1522.

The execution detection unit 1521 has a function to detect when a predetermined application program is scheduled to be newly executed on a virtual machine. For example, within the virtual machine generation module 361 in Embodiment 1, the execution detection unit 1521 is implemented as the portion implementing the function to receive, from the virtual machine start-up request detection module 331, notification that start-up of the application program targeted for protection has been requested.

When the execution detection unit 1521 being executed by the processor 1510 detects that a predetermined application program is scheduled to be newly executed on the first virtual machine 1530, the virtual machine generation unit 1522 has a function to generate a new second virtual machine 1540, based on the first virtual machine 1530, to execute the predetermined application program.

The first virtual machine 1530 is one of the plurality of virtual machines whose execution is controlled by the processor 1510. An example of the first virtual machine 1530 is the virtual machine 301 of Embodiment 1. Furthermore, the first virtual machine 1530 has an execution control unit 1531.

The execution control unit 1531 has a function to, in the second virtual machine 1540, cause the processor 1510 to execute only a specific group of programs that includes the predetermined application program, and to cause, in the first virtual machine 1530, the processor 1510 to execute a predetermined dummy program instead of the predetermined application program. An example of the execution control unit 1531 is a module composed of the protected task generation module 342 and the task schedule switching module 343 in Embodiment 1.

The second virtual machine 1540 is one of a plurality of virtual machines whose execution is controlled by the processor 1510. An example of the second virtual machine 1540 is the child virtual machine 302 of Embodiment 1. Furthermore, the second virtual machine 1540 has an execution control unit 1532 which has a function equivalent to the execution control unit 1531.

(b) When generating the new second virtual machine based on the first virtual machine, the virtual machine generation unit may allocate a memory area to the second virtual machine by forking based on a memory area allocated to the first virtual machine.

With this structure, the memory areas used by the first virtual machine and second virtual machine are partially shared. Accordingly, it is possible to effectively utilize the memory areas.

(c) The hypervisor may further include a virtual machine scheduling unit configured to switch a target of execution by the processor from the first virtual machine to the second virtual machine when the target of execution by the processor is the first virtual machine, execution of the predetermined dummy program starts on the first virtual machine, and the second virtual machine is generated.

With this structure, it is possible to switch the virtual machine targeted for execution from the first virtual machine to the second virtual machine upon initiation of execution of the dummy program on the first virtual machine.

(d) The virtual machine scheduling unit may switch the target of execution by the processor from the second virtual machine to the first virtual machine when the target of execution by the processor is the second virtual machine and execution of the predetermined application program on the second virtual machine terminates.

With this structure, it is possible to switch the virtual machine targeted for execution from the second virtual machine to the first virtual machine upon termination of execution of the predetermined application program on the second virtual machine.

(e) The hypervisor may further include a virtual machine deletion unit configured to delete the second virtual machine after the virtual machine scheduling unit switches the target of execution by the processor from the second virtual machine to the first virtual machine when the target of execution by the processor is the second virtual machine and execution of the predetermined application program on the second virtual machine terminates.

With this structure, it is possible to delete the second virtual machine upon termination of execution of the predetermined application program on the second virtual machine.

(f) The execution control unit may include a multitask execution control unit configured to cause the processor to control execution of a program with a multitask execution control method using a time slice, the multitask execution control unit may allocate, to the predetermined dummy program, a time slice that is the same as a time slice allocated to the predetermined application program when the execution control unit being executed by the processor causes the processor to execute the predetermined dummy program instead of the predetermined application program, and the virtual machine scheduling unit may switch the target of execution by the processor from the second virtual machine to the first virtual machine when the second virtual machine is the target of execution by the processor and a time indicated by the time slice allocated to the predetermined dummy program elapses after a point at which the predetermined dummy program becomes the target of execution by the processor on the first virtual machine.

With this structure, it is possible to switch the virtual machine targeted for execution from the second virtual machine to the first virtual machine when the time indicated by the time slice allocated to the predetermined application program elapses after a point at which the predetermined dummy program is executed on the first virtual machine.

(g) The hypervisor may further include a child virtual machine notification unit configured to notify the execution control unit of the second virtual machine, when the virtual machine generation unit executed by the processor generates the second virtual machine, that the second virtual machine is a child virtual machine, and the execution control unit may include an execution start unit configured to cause the processor to start up the predetermined application program on the second virtual machine upon receipt, in the second virtual machine, of notification from the child virtual machine notification unit that the second virtual machine is a child virtual machine.

With this structure, it is possible, upon generation of the second virtual machine, for the predetermined application program to be started up on the generated second virtual machine.

(h) The specific group of programs may include only programs that do not include malware that attacks the predetermined application program.

With this structure, on the second virtual machine, it is possible to prevent attacks on the predetermined application program by malware.

(i) Each of the plurality of virtual machines whose execution is controlled by the processor may include a notification unit configured to detect when the predetermined application program is scheduled to be newly executed on the virtual machine of the notification unit and to notify the execution detection unit that the predetermined application program is scheduled to be newly executed, and the execution detection unit may detect that the predetermined application program is scheduled to be newly executed by being notified, by the notification unit executed by the processor, that the predetermined application program is scheduled to be newly executed.

With this structure, it is possible to detect, within a virtual machine, when the predetermined application program is scheduled to be newly executed on the virtual machine.

(j) Each of the plurality of virtual machines whose execution is controlled by the processor may include a dummy program execution start notification unit configured to notify the virtual machine scheduling unit that the processor has started execution of the predetermined dummy program on the virtual machine of the dummy program execution start notification unit when the processor starts execution of the predetermined dummy program on the virtual machine of the dummy program execution start notification unit, and the virtual machine scheduling unit may detect that execution of the predetermined dummy program has started on the first virtual machine upon being notified, by the dummy program execution start notification unit of the first virtual machine, that the processor has started execution of the predetermined dummy program on the virtual machine of the dummy program execution start notification unit.

With this structure, it is possible to detect, within a virtual machine, when execution of the predetermined dummy program has been initiated on the virtual machine.

(k) Each of the plurality of virtual machines whose execution is controlled by the processor may include an execution termination notification unit configured to notify the virtual machine scheduling unit that execution of the predetermined application program on the virtual machine of the execution termination notification unit has terminated when execution of the predetermined application program on the virtual machine of the execution termination notification unit terminates, and the virtual machine scheduling unit may detect that execution of the predetermined application program has terminated on the second virtual machine upon being notified, by the execution termination notification unit of the second virtual machine, that execution of the predetermined application program has terminated on the virtual machine of the execution termination notification unit.

With this structure, it is possible to detect, within a virtual machine, when execution of the predetermined application program has terminated on the virtual machine.

The device of the present invention may be widely used in virtual machine systems.

REFERENCE SIGNS LIST 100 virtual machine system
110 integrated circuit
101 processor
102 ROM
103 RAM
104 timer
120 internal bus
131 input device
132 output device
133 hard disk device
300 module group
301 virtual machine
302 child virtual machine
313 dummy task
316 protected task
321 first OS
322 second OS
331, 341 start-up request detection module
332, 342 protected task generation module
333, 343 task schedule switching module
334, 344 protected task termination notification module
335, 345 dummy task execution notification module
336, 346 protected task correspondence table
351 hypervisor
361 virtual machine generation module
362 child virtual machine notification module
363 virtual machine scheduling module
364 virtual machine deletion module

The invention claimed is:

1. A virtual machine system comprising:
a processor; and
a hypervisor, executed on the processor, configured to cause the processor to control execution of a plurality of virtual machines, wherein the hypervisor includes:
an execution detection unit configured to detect when a predetermined application program is scheduled to be newly executed on a first virtual machine;
a virtual machine generation unit configured to generate, when the execution detection unit detects that the predetermined application program is scheduled to be newly executed on the first virtual machine, a second virtual machine for executing the predetermined application program, the second virtual machine being based on the first virtual machine; and
an execution control unit, the execution control unit configured to determine whether itself is included in the first virtual machine or the second virtual machine, the execution control unit, when determining that itself is included in the second virtual machine, configured to cause the processor to execute only a specific group of programs that includes the predetermined application program on the second virtual machine, and the execution control unit, when determining that itself is included in the first virtual machine, configured to cause the processor to execute a predetermined dummy program instead of the predetermined application program on the first virtual machine,
wherein the predetermined dummy program causes the processor to execute only tasks associated with the predetermined dummy program and no other tasks, and the specific group of programs includes only programs that do not include malware that attacks the predetermined application program,
the dummy program includes a repetition of a NOP (No Operation),
the first virtual machine and the second virtual machine each have an operating system, and the respective operating systems of the first and second virtual machine run concurrently, and
the operating system of the second virtual machine performs execution and control of the predetermined application program, and the operating system of the first virtual machine performs execution and control of the predetermined dummy program.

2. The virtual machine system of claim 1, wherein when generating the new second virtual machine based on the first virtual machine, the virtual machine generation unit allocates a memory area to the second virtual machine by forking based on a memory area allocated to the first virtual machine.

3. The virtual machine system of claim 2, wherein the hypervisor further includes a virtual machine scheduling unit configured to switch a target of execution by the processor from the first virtual machine to the second virtual machine when execution of the predetermined dummy program starts on the first virtual machine, which is being executed by the processor.

4. The virtual machine system of claim 3, wherein the virtual machine scheduling unit switches the target of execution by the processor from the second virtual machine to the first virtual machine when execution of the predetermined application program on the second virtual machine, which is being executed by the processor, terminates.

5. The virtual machine system of claim 4, wherein the hypervisor further includes a virtual machine deletion unit configured to delete the second virtual machine after the virtual machine scheduling unit switches the target of execution by the processor from the second virtual machine to the first virtual machine when execution of the predetermined application program on the second virtual machine, which is being executed by the processor, terminates.

6. The virtual machine system of claim 5, wherein the execution control unit of each virtual machine includes a multitask execution control unit configured to cause the processor to control execution of a program with a multitask execution control method using a time slice, the multitask execution control unit of the first virtual machine allocates, to the predetermined dummy program, a time slice that is the same as a time slice allocated to the predetermined application program when the execution control unit of the first virtual machine, which is being executed by the processor causes the processor to execute the predetermined dummy program instead of the predetermined application program, and the virtual machine scheduling unit switches the target of execution by the processor from the second virtual machine to the first virtual machine when the second virtual machine is being executed after the time slice allocated to the predetermined dummy program elapses from when the execution of the predetermined dummy program starts on the first virtual machine.

7. The virtual machine system of claim 6, wherein the hypervisor further includes a child virtual machine notification unit configured to notify the execution control unit of the second virtual machine, when the virtual machine generation unit executed by the processor generates the second virtual machine, that the second virtual machine is a child virtual machine, and the execution control unit of the second virtual machine includes an execution start unit configured to cause the processor to start up the predetermined application program on the second virtual machine upon receipt of notification from the child virtual machine notification unit that the second virtual machine is a child virtual machine.

8. The virtual machine system of claim 7, wherein each of the plurality of virtual machines whose execution is controlled by the processor includes a notification unit, the notification unit of the first virtual machine configured to detect when the predetermined application program is scheduled to be newly executed on the first virtual machine and to notify the execution detection unit that the predetermined application program is scheduled to be newly executed on the first virtual machine, and the execution detection unit detects that the predetermined application program is scheduled to be newly executed on the first virtual machine when the notification unit of the first virtual machine notifies the execution detection unit that the predetermined application program is scheduled to be newly executed on the first virtual machine.

9. The virtual machine system of claim 7, wherein each of the plurality of virtual machines whose execution is controlled by the processor includes a dummy program execution start notification unit, the dummy program execution start notification unit of the first virtual machine configured to notify the virtual machine scheduling unit that the processor has started execution of the predetermined dummy program on the first virtual machine when the processor starts execution of the predetermined dummy program on the first virtual machine, and the virtual machine scheduling unit detects that execution of the predetermined dummy program has started on the first virtual machine when the dummy program execution start notification unit of the first virtual machine notifies the virtual machine scheduling unit that the processor has started execution of the predetermined dummy program on the first virtual machine.

10. The virtual machine system of claim 7, wherein each of the plurality of virtual machines whose execution is controlled by the processor includes an execution termination notification unit, the execution termination notification unit of the second virtual machine configured to notify the virtual machine scheduling unit that execution of the predetermined application program on the second virtual machine has terminated when execution of the predetermined application program on the second virtual machine terminates, and the virtual machine scheduling unit detects that execution of the predetermined application program has terminated on the second virtual machine when the execution termination notification unit of the second virtual machine notifies the virtual machine scheduling unit that execution of the predetermined application program on the second virtual machine has terminated.

11. A virtual machine control method for controlling a virtual machine system comprising a processor and a hypervisor, executed on the processor, configured to cause the processor to control execution of a plurality of virtual machines, the virtual machine control method comprising the steps of:

detecting, by the hypervisor, when a predetermined application program is scheduled to be newly executed on a first virtual machine;

generating, by the hypervisor, when the execution detection step detects that the predetermined application program is scheduled to be newly executed on the first virtual machine, a second virtual machine based on the first virtual machine, the second virtual machine being for executing the predetermined application program; and performing execution control using a control unit, the control unit being configured to determine whether itself is included in the first virtual machine or the second virtual machine, the execution control by the control unit, when determining that itself is included in the second virtual machine, causing the processor to execute only a specific group of programs that includes the predetermined application program on the second virtual machine, and the execution control by the control unit, when determining itself is included in the first virtual machine, causing the processor to execute a predetermined dummy program instead of the predetermined application program on the first virtual machine, wherein the predetermined dummy program causes the processor to execute only tasks associated with the predetermined dummy program and no other tasks, and the specific group of programs includes only programs that do not include malware that attacks the predetermined application program, the dummy program includes a repetition of a NOP (No Operation), the first virtual machine and the second virtual machine each have an operating system, and the respective operating systems of the first and second virtual machine run concurrently, and the operating system of the second virtual machine performs execution and control of the predetermined application program, and the operating system of the first virtual machine performs execution and control of the predetermined dummy program.

12. A non-transitory computer-readable recording medium storing a virtual machine control program for controlling a virtual machine system comprising a processor and a hypervisor, executed on the processor, configured to cause the processor to control execution of a plurality of virtual machines, the virtual machine control program causing a computer to perform steps comprising:

detecting, by the hypervisor, when a predetermined application program is scheduled to be newly executed on a first virtual machine;

generating, by the hypervisor, when the execution detection step detects that the predetermined application program is scheduled to be newly executed on the first virtual machine, a second virtual machine based on the first virtual machine, the second virtual machine being for executing the predetermined application program; and performing execution control using a control unit, the control unit being configured to determine whether itself is included in the first virtual machine or the second virtual machine, the execution control by the control unit, when determining that itself is included in the second virtual machine, causing the processor to execute only a specific group of programs that includes the predetermined application program on the second virtual machine, and the execution control by the control unit, when determining itself is included in the first virtual machine, causing the processor to execute a predetermined dummy program instead of the predetermined application program on the first virtual machine, wherein the predetermined dummy program causes the processor to execute only tasks associated with the predetermined dummy program and no other tasks, and the specific group of programs includes only programs that do not include malware that attacks the predetermined application program, the dummy program includes a repetition of a NOP (No Operation), the first virtual machine and the second virtual machine each have an operating system, and the respective operating systems of the first and second virtual machine run concurrently, and the operating system of the second virtual machine performs execution and control of the predetermined application program, and the operating system of the first virtual machine performs execution and control of the predetermined dummy program.

13. A semiconductor integrated circuit comprising:

a processor; and a hypervisor, executed on the processor, configured to cause the processor to control execution of a plurality of virtual machines, wherein the hypervisor includes:

an execution detection unit configured to detect when a predetermined application program is scheduled to be newly executed on a first virtual machine;

a virtual machine generation unit configured to generate, when the execution detection unit detects that the predetermined application program is scheduled to be newly executed on the first virtual machine, a second virtual machine based on the first virtual machine, the second virtual machine being for executing the predetermined application program; and an execution control unit, the execution control unit configured to determine whether itself is included in the first virtual machine or the second virtual machine, the execution control unit, when determining that itself is included in the second virtual machine, configured to cause the processor to execute only a specific group of programs that includes the predetermined application program on the second virtual machine, and the execution control unit, when determining that itself is included in the first virtual machine, configured to cause the processor to execute a predetermined dummy program instead of the predetermined application program on the first virtual machine, wherein the predetermined dummy program causes the processor to execute only tasks associated with the predetermined dummy program and no other tasks, and the specific group of programs includes only programs that do not include malware that attacks the predetermined application program, the dummy program includes a repetition of a NOP (No Operation), the first virtual machine and the second virtual machine each have an operating system, and the respective operating systems of the first and second virtual machine run concurrently, and the operating system of the second virtual machine performs execution and control of the predetermined application program, and the operating system of the first virtual machine performs execution and control of the predetermined dummy program.

\* \* \* \* \*